United States Patent
Fujihira et al.

(10) Patent No.: US 8,456,995 B2
(45) Date of Patent: Jun. 4, 2013

(54) PACKET TRANSFER SYSTEM, NETWORK MANAGEMENT APPARATUS, AND EDGE NODE

(75) Inventors: Kenji Fujihira, Yokohama (JP); Takumi Oishi, Kodaira (JP); Shinya Fujioka, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 385 days.

(21) Appl. No.: 12/819,862

(22) Filed: Jun. 21, 2010

(65) Prior Publication Data
US 2010/0322072 A1 Dec. 23, 2010

(30) Foreign Application Priority Data
Jun. 22, 2009 (JP) ................................ 2009-147180

(51) Int. Cl.
H04L 12/28 (2006.01)
H04L 12/66 (2006.01)

(52) U.S. Cl.
USPC ............................ 370/235; 370/401; 370/465

(58) Field of Classification Search
None
See application file for complete search history.

(56) References Cited

U.S. PATENT DOCUMENTS

| | | | | |
|---|---|---|---|---|
| 6,826,147 B1* | 11/2004 | Nandy et al. | .................. | 370/229 |
| 7,085,236 B2* | 8/2006 | Oldak et al. | ............... | 370/235.1 |
| 7,286,485 B1* | 10/2007 | Ouellette et al. | .............. | 370/252 |
| 7,372,814 B1* | 5/2008 | Chiruvolu et al. | ............ | 370/235 |
| 7,596,084 B2* | 9/2009 | Liu et al. | ....................... | 370/229 |
| 7,630,338 B2* | 12/2009 | Vesterinen et al. | ........... | 370/329 |
| 7,697,519 B2* | 4/2010 | Arndt | ............................ | 370/389 |
| 7,697,558 B2* | 4/2010 | Pilon et al. | ..................... | 370/430 |
| 7,969,881 B2* | 6/2011 | Ansari et al. | ................... | 370/232 |
| 8,005,087 B2* | 8/2011 | Dolganow et al. | ............ | 370/392 |
| 2003/0107991 A1 | 6/2003 | Tezuka et al. | | |
| 2004/0190527 A1 | 9/2004 | Okura et al. | | |
| 2007/0086347 A1* | 4/2007 | Reynolds | ...................... | 370/237 |
| 2008/0101354 A1* | 5/2008 | Arndt | ............................ | 370/389 |

FOREIGN PATENT DOCUMENTS

| | | |
|---|---|---|
| JP | 2002-190826 A | 7/2002 |
| JP | 2003-179636 A | 6/2003 |
| JP | 2004-64569 A | 2/2004 |
| JP | 2005-204157 A | 7/2005 |
| JP | 2005-217823 A | 8/2005 |
| JP | 2007-336600 A | 12/2007 |
| JP | 2008-5257 A | 1/2008 |
| JP | 2008-294535 A | 12/2008 |

OTHER PUBLICATIONS

J. Hinanen, R. Guerin, "A Two Rate Three Color Maker", IETF RFC2698 Sep. 1999 (Five (5) pages).
Japanese Office Action dated Jan. 22, 2013 (two (2) pages).

* cited by examiner

*Primary Examiner* — Gregory Sefcheck
(74) *Attorney, Agent, or Firm* — Crowell & Moring LLP

(57) ABSTRACT

A packet transport system to which the present invention is applied includes an edge node accommodating an access network at an edge, and a core node of carrying out a processing of assorting a frame gathered from a plurality of the edge nodes, the edge node provides a label to the frame flowing in from the access network, and the packet transport system transmits the frame in reference to the label. The edge node includes a priority information providing portion of changing a piece of priority information provided to the frame flowing in from the access network in accordance with a congested state of the core node, and a priority previously set to a path specified by the label.

13 Claims, 24 Drawing Sheets

FIG. 9

PATH PRIORITY TABLE a
111

| NODE ID (401) | THRESHOLD OF ABANDONING YELLOW FRAME FOR CHANGING POLICY (Mbps) (402) | THRESHOLD OF ABANDONING YELLOW FRAME FOR RECOVERING POLICY (Mbps) (403) | ACCOMMODATED PATH ID (404) | PATH PRIORITY (405) | COLOR INFORMATION PROVIDING NODE ID (406) | MINIMUM ASSURANCE BAND (Mbps) (407) | MAXIMUM ASSURANCE BAND (Mbps) (408) | POLICY CHANGE FLAG (409) |
|---|---|---|---|---|---|---|---|---|
| CoreNode-4 | 100 | 50 | Path-1 | 1 | EdgeNode-1 | 100 | 1000 | FALSE |
| | | | Path-2 | 2 | EdgeNode-2 | 300 | 1500 | FALSE |
| | | | Path-3 | 3 | EdgeNode-3 | 200 | 2000 | FALSE |
| CoreNode-5 | 90 | 40 | Path-2 | 1 | EdgeNode-2 | 300 | 1500 | FALSE |
| | | | Path-3 | 2 | EdgeNode-3 | 200 | 2000 | FALSE |

FIG. 10

PATH PRIORITY TABLE b
111

| NODE ID (401) | THRESHOLD OF ABANDONING YELLOW FRAME FOR CHANGING POLICY (Mbps) (402) | THRESHOLD OF ABANDONING YELLOW FRAME FOR RECOVERING POLICY (Mbps) (403) | ACCOMMODATED PATH ID (404) | PATH PRIORITY (405) | COLOR INFORMATION PROVIDING NODE ID (406) | MINIMUM ASSURANCE BAND (Mbps) (407) | MAXIMUM ASSURANCE BAND (Mbps) (408) | POLICY CHANGE FLAG (409) |
|---|---|---|---|---|---|---|---|---|
| CoreNode-4 | 100 | 50 | Path-1 | 1 | EdgeNode-1 | 100 | 1000 | FALSE |
| | | | Path-2 | 2 | EdgeNode-2 | 300 | 1500 | FALSE |
| | | | Path-3 | 3 | EdgeNode-3 | 200 | 2000 | TRUE |
| CoreNode-5 | 90 | 40 | Path-2 | 1 | EdgeNode-2 | 300 | 1500 | FALSE |
| | | | Path-3 | 2 | EdgeNode-3 | 200 | 2000 | TRUE |

FIG. 11

PATH PRIORITY TABLE c
111

| NODE ID (401) | THRESHOLD OF ABANDONING YELLOW FRAME FOR CHANGING POLICY (Mbps) (402) | THRESHOLD OF ABANDONING YELLOW FRAME FOR RECOVERING POLICY (Mbps) (403) | ACCOMMODATED PATH ID (404) | PATH PRIORITY (405) | COLOR INFORMATION PROVIDING NODE ID (406) | MINIMUM ASSURANCE BAND (CIR) (Mbps) (407) | MAXIMUM ASSURANCE BAND (PIR) (Mbps) (408) | POLICY CHANGE FLAG (409) |
|---|---|---|---|---|---|---|---|---|
| CoreNode-4 | 100 | 50 | Path-1 | 1 | EdgeNode-1 | 100 | 1000 | FALSE |
| | | | Path-2 | 2 | EdgeNode-2 | 300 | 1500 | TRUE |
| | | | Path-3 | 3 | EdgeNode-3 | 200 | 2000 | TRUE |
| CoreNode-5 | 90 | 40 | Path-2 | 1 | EdgeNode-2 | 300 | 1500 | TRUE |
| | | | Path-3 | 2 | EdgeNode-3 | 200 | 2000 | TRUE |

FIG. 12

130
POLICY CHANGE TABLE

| PATH ID (441) | CONDITION (442) | POLICY IN RECOVERING CONGESTION (443) | POLICY IN GENERATING CONGESTION (444) |
|---|---|---|---|
| Path-1 | 1000 Mbps < INR | RED | RED |
|  | 100 Mbps < INR < 1000 Mbps | YELLOW | RED |
|  | INR < 100 Mbps | GREEN | GREEN |
| Path-4 | 1600 Mbps < INR | RED | RED |
|  | 400 Mbps < INR < 1600 Mbps | YELLOW | RED |
|  | INR < 400 Mbps | GREEN | GREEN |

FIG. 21

PATH PRIORITY TABLE d
111

| NODE ID (460) | THRESHOLD OF ABANDONING YELLOW FRAME FOR CHANGING POLICY (Mbps) (461) | | THRESHOLD OF ABANDONING YELLOW FRAME FOR RECOVERING POLICY (Mbps) (462) | | ACCOMMODATED PATH ID (463) | PATH PRIORITY (464) | COLOR INFORMATION PROVIDING NODE ID (465) | MINIMUM ASSURANCE BAND (Mbps) (466) | MAXIMUM ASSURANCE BAND (Mbps) (467) | POLICY CHANGE FLAG (468) |
|---|---|---|---|---|---|---|---|---|---|---|
| | 1 Path | 2 Path | 1 Path | 2 Path | | | | | | |
| CoreNode-4 | 100 | 200 | 50 | 25 | Path-1 | 1 | EdgeNode-1 | 100 | 1000 | FALSE |
| | | | | | Path-2 | 2 | EdgeNode-2 | 300 | 1500 | FALSE |
| | | | | | Path-3 | 3 | EdgeNode-3 | 200 | 2000 | FALSE |
| CoreNode-5 | 900 | 1800 | 400 | 200 | Path-2 | 1 | EdgeNode-2 | 300 | 1500 | FALSE |
| | | | | | Path-3 | 2 | EdgeNode-3 | 200 | 2000 | FALSE |

FIG. 22

PATH PRIORITY TABLE e (111)

| NODE ID (460) | THRESHOLD OF ABANDONING YELLOW FRAME FOR CHANGING POLICY (Mbps) (461) | | THRESHOLD OF ABANDONING YELLOW FRAME FOR RECOVERING POLICY (Mbps) (462) | | ACCOMMODATED PATH ID (463) | PATH PRIORITY (464) | COLOR INFORMATION PROVIDING NODE ID (465) | MINIMUM ASSURANCE BAND (Mbps) (466) | MAXIMUM ASSURANCE BAND (Mbps) (467) | POLICY CHANGE FLAG (468) |
|---|---|---|---|---|---|---|---|---|---|---|
| | 1 Path | 2 Path | 1 Path | 2 Path | | | | | | |
| CoreNode-4 | 100 | 200 | 50 | 25 | Path-1 | 1 | EdgeNode-1 | 100 | 1000 | FALSE |
| | | | | | Path-2 | 2 | EdgeNode-2 | 300 | 1500 | TRUE |
| | | | | | Path-3 | 3 | EdgeNode-3 | 200 | 2000 | TRUE |
| CoreNode-5 | 900 | 1800 | 400 | 200 | Path-2 | 1 | EdgeNode-2 | 300 | 1500 | TRUE |
| | | | | | Path-3 | 2 | EdgeNode-3 | 200 | 2000 | TRUE |

PACKET TRANSFER SYSTEM, NETWORK MANAGEMENT APPARATUS, AND EDGE NODE

CLAIM OF PRIORITY

The present application claims priority from Japanese patent application JP 2009-147180 filed on Jun. 22, 2009, the content of which is hereby incorporated by reference into this application.

FIELD OF THE INVENTION

The present invention relates to a system of, transferring a packet by way of a network, particularly to an improvement in a quality assurance system in T-MPLS (Transport Multi Protocol Label Switching) network.

BACKGROUND OF THE INVENTION

An amount of information circulating in a network in an enterprise has been increasing year by year, and an importance of a communication service for an enterprise user has been more and more enhanced. In accordance with the situation, a communication common carrier provides a virtual dedicated line service to an enterprise user as an object by laying a communication network for connecting LAN's in an enterprise which are arranged at plural key points.

In a communication service for an enterprise user as an object, a high reliability is requested in order to firmly carry out a communication of important data. Hence, attention is paid to T-MPLS realizing to assure a band by establishing a path previously ensured with the band from end to end.

T-MPLS is a kind of an MPLS (Multi Protocol Label Switching) technology providing a label to an IP packet, and transferring the IP packet by referring to the label. A communication network applied with T-MPLS (hereinafter, T-MPLS network) accommodates plural access networks and provides a communication service between LAN's in an enterprise connected to the access networks. The T-MPLS network is constituted by an edge node accommodating the access network at an edge and a core node carrying out a process of assorting frames gathered from the plural edge nodes. A person operating the T-MPLS network sets and monitors a path accommodated by the T-MPLS network by using NMS (Network Management System).

The edge node sets color information (green or yellow or red) described in J. Hinanen, R. Guerin, "A Two Rate Three Color Marker", IETF RFC2698 September, 1999 to a frame flowing in from the access network. The color information represents a priority of transferring the frame, showing that green has the highest priority and red has the lowest priority. The edge node as well as the core node predominantly transfers a frame having a high priority by referring to the color information set to the frame. Specifically, the edge node as well as the core node transfer a frame set with green (hereinafter, green frame) more predominantly than a frame set with yellow (hereinafter, yellow frame). Further, the edge node as well as the core node transfer the yellow frame more predominantly than a frame set with red (hereinafter, red frame). Further, the core node carries out a process of transferring a frame without updating the color information in the frame so as to restrain a load in order to process enormous traffic gathered from a number of the edge nodes.

As a technology of transferring a frame in accordance with color information, a technology described in JP-A-2008-294535 provides color information in accordance with an inflowing band (INR) and determines whether the frame is to be transferred or abandoned based on the color information and a situation of vacancy of a frame processing buffer within the same node. The technology previously sets a minimum assurance band (CIR) and a maximum assurance band (PIR) for each path, and sets green in a case of INR<CIR, yellow in a case of CIR<INR<PIR, and red in a case of PIR<INR. The node transfers the green frame and abandons the red frame. Further, the technology sets a priority previously to a path, transfers the yellow frame when the buffer is vacant, transfers only the yellow frame of a high priority path, and abandons the yellow frame of a low priority path when the buffer is crowded.

SUMMARY OF THE INVENTION

In the communication service provided by the T-MPLS network, the communication of the important data is carried out for the enterprise user as the object, and therefore, it is requested to maintain a high communication quality by the firm transferring by reducing abandonment of the frame. However, the abandonment of the frame occurs when traffic is increased in a node constituting the T-MPLS network, and the buffer for the frame transfer processing provided to the node overflows.

The frame transferring technology described in JP-A-2008-294535 provides the color information in accordance with the inflowing band (INR), and determines whether the yellow frame can be transferred in accordance with the situation of the buffer for the frame transfer processing provided to the node and the priority of the path. That is, when the buffer is crowded, the technology maintains the communication quality of the high priority path by predominantly transferring the yellow frame of the path having the high priority. The technology of JP-A-2008-294535 can be applied only in a case where a congested node is a node the same as a node of providing the color information.

However, in the T-MPLS network, the color information is provided by the edge node. Therefore, in a case where a congestion occurs at the core node of the T-MPLS network, the congested node differs from the node of providing the color information, and therefore, the technology of JP-A-2008-294535 cannot be applied. That is, when the technology of JP-A-2008-294535 is applied to the T-MPLS network, at the edge node, the color information is provided by the inflowing band of the edge node. Therefore, there poses a problem that even when the path is a high priority path, in a case where the core node is brought into a congested state, the yellow frame of the high priority path is abandoned at the core node, and the communication quality of the high priority path cannot be maintained. Further, at the core node in the midway of the path, the yellow frame is abandoned when the core node is brought into the congested state. Therefore, there also poses a problem that a band is consumed wastefully in a path until the yellow frame is abandoned after flowing into the T-MPLS network, and the band cannot effectively be utilized.

It is an object of the present invention to avoid a congestion while reducing abandonment of a frame of a high priority path when a core node is brought into a congested state in the T-MPLS network providing color information to the frame at an edge node and determining the priority of transferring the frame based on the color information. As a result thereof, it is another object of the present invention to provide a packet transport system enabling assurance of a quality of a service provided by a high priority path and enabling to effectively utilize a band.

In order to resolve the above-described problem, a packet transport system applied with the present invention includes an edge node accommodating an access network at an edge, and a core node of carrying out a process of assorting frames gathered from the plural edge nodes, the edge node provides a label to the frame flowing in from the access network, and transfers the frame by referring to the label. The edge node changes priority information provided to the frame flowing in from the access network in accordance with a congested state of the core node and a priority previously set to a path specified by the label.

According to an aspect of the present invention, the edge node changes the color information provided to the frame in accordance with the congested state of the core node and the priority of the path. As a result thereof, when the core node is brought into the congested state, the congestion can be avoided while reducing abandonment of the frame of the high priority path at the core node by providing color information of a low priority to a frame of a low priority path. Thereby, when the core node is brought into the congested state by being caused by an increase in traffic, the quality of the service provided by the high priority path can be assured. Further, abandonment of the yellow frame at the core node is reduced, and therefore, an amount of the frame which is abandoned at the midway when the yellow frame passes through the T-MPLS network is reduced, and the band can effectively be utilized.

BRIEF DESCRIPTION OF THE DRAWINGS

FIG. 9 is an explanatory diagram showing the first embodiment, and showing an example of a path priority table;

FIG. 10 is an explanatory diagram showing the first embodiment, and showing an example of the path priority table after having been updated;

FIG. 11 is an explanatory diagram showing the first embodiment, and showing other example of the path priority table after having been updated;

FIG. 12 is an explanatory diagram showing the first embodiment, and showing an example of a policy change table;

FIG. 21 is an explanatory diagram showing the second embodiment, and showing an example of a path priority table;

FIG. 22 is an explanatory diagram showing the second embodiment, and showing an example of the path priority table after having been updated;

DETAILED DESCRIPTION OF THE PREFERRED EMBODIMENTS

An explanation will be given of an embodiment of the present invention in reference to attached drawings as follows.

Figure 1:
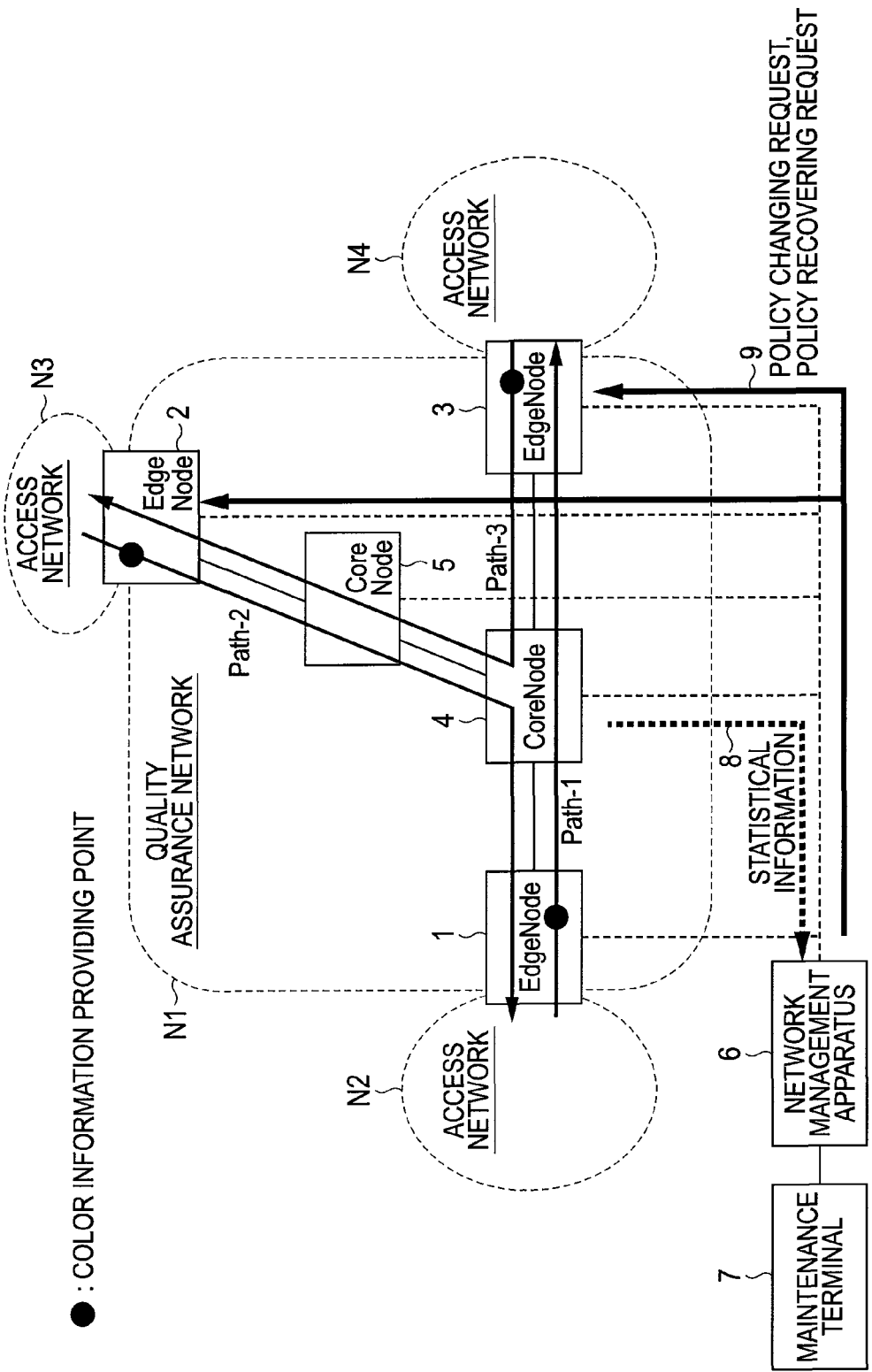
FIG. 1 is a block diagram showing a first embodiment, and showing an example of a constitution of a communication system to which the present invention is applied.

FIG. 1 is a block diagram showing an example of a packet transport system to which the present invention is applied.

A packet transport system according to the present invention is constituted by a quality assurance network N1, and access networks N2, N3, and N4 connected to the quality assurance network N1, a network management apparatus 6 controlling the quality assurance network N1, and a maintenance terminal 7 connected to the network management apparatus 6, and providing an operation interface of the network management apparatus 6 to a controlling person of the quality assurance network N1.

The quality assurance network N1 includes edge nodes 1, 2, and 3 accommodating the access networks N2, N3, and N4 at edges thereof, as well as core nodes 4, and 5 of carrying out a processing of assorting frames gathered from the edge nodes, 1, 2, and 3. The edge node 1 accommodates the access network N2, the edge node 2 accommodates the access network N3, and the edge node 3 accommodates the access network N4. The core node 4 is connected to the edge node 1, the edge node 3, and the core node 5, and carries out the frame assorting processing. The core node 5 is connected to the edge node 2, and the core node 4, and carries out the frame assorting processing.

The network management apparatus 6 is connected to the edge nodes 1, 2, and 3, and the core nodes 4, and 5, and carries out setting of a path accommodated by the quality assurance network N1, and monitoring of traffic. An operator of the quality assurance network N1 sets paths 1, 2, and 3 by using an interface provided by the maintenance terminal 7. Paths 1, 2, and 3 are logically set flows, and there is a case where one physical transfer path accommodates plural paths described above. Path 1 is a path of transferring a frame from the access network N2 to the access network N4, the edge node 1 transfers a frame to the core node 4, and the core node 4 transfers the frame to the edge node 3. Path 2 is a path of transferring a frame from the access network N3 to the access network N2, the edge node 2 transfers a frame to the core node 5, the core node 5 transfers the frame to the core node 4, and the core node 4 transfers the frame to the edge node 1. Path 3 is a path of transferring a frame from the access network N4 to the access network N3, the edge node 3 transfers a frame to the core node 4, the core node 4 transfers the frame to the core node 5, and the core node 5 transfers the frame to the edge node 2.

The operator of the quality assurance network N1 previously sets a minimum assurance band (hereinafter, CIR), and a maximum assurance band (hereinafter, PIR) to each of the paths 1, 2, and 3. The edge nodes 1, 2, and 3, and the core nodes 4, and 5 (hereinafter, generally referred to as "nodes") constituting the quality assurance network N1 provide a band assurance service by ensuring CIR for respective paths. Further, the nodes 1, 2, 3, 4, and 5 constituting the quality assurance network N1 abandon a frame when an inflowing band (INR) exceeds PIR.

The edge nodes 1, 2, and 3 set color information representing a transfer priority to a frame flowing in from the access networks N1, N2 and N3. In the color information, there are 3 kinds of green, yellow, and red in an order of higher priorities. The edge nodes 1, 2, and 3 set green when INR is equal to or less than CIR and set red when INR is equal to or more than PIR. Further, the edge nodes 1, 2, and 3 determine which of a policy for when a congestion is recovered and a policy for when a congestion occurs both of which are previously set, is to be applied in accordance with presence or absence of reception of a policy changing/recovering request 9 from the network management apparatus 6, and provide yellow or red in accordance with the corresponding policy in a case where INR is equal to or more than CIR and equal to or less than PIR. Although an explanation is given here as the example of 3 kinds of green, yellow, and red, the transfer priority is not limited to 3 kinds, is not limited to green, yellow, and red, further, is not limited to the color information.

Figure 8:
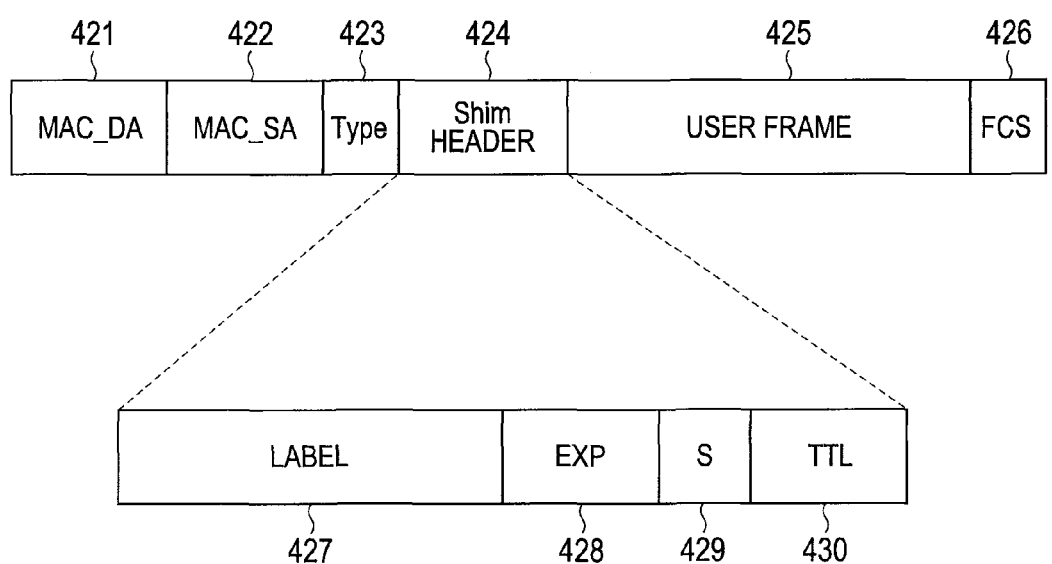
FIG. 8 is an explanatory diagram showing the first embodiment, and showing an example of a constitution of a frame transferred by a quality assurance network.

An explanation will be given of a method of setting the color information in reference to FIG. 8. FIG. 8 shows a constitution of a frame transferred by the quality assurance network N1. A frame transferred by the quality assurance network N1 is constituted by MAC_SA422 representing a transmission destination MAC address, MAC_SA422 representing a transmission origin MAC address, Type 423 representing Ether type, Shim header 424 provided by the quality assurance network N1, a user frame 425 including an IP header and IP payload and FCS 426.

The Shim header is constituted by a label 427, 3 bits field EXP 428 reserved for an experimental use, an end stack S429, and TTL 430. 3 bits value representing green, yellow, or red is previously determined in the quality assurance network N1, and the edge nodes 1, 2, and 3 set 3 bits information in correspondence with green, yellow, or red to EXP 428 of an inflowing frame. The edge nodes 1, 2, and 3 can set the color information to a frame by the method described above.

Referring back to FIG. 1, the core nodes 4, and 5 transmit statistical information 8 to the network management apparatus 6 at every constant time period. The statistical information 8 is information with regard to traffic processed by the core nodes 4, and 5, and includes a data size of transfer traffic, a data size of an abandoned green frame, and a data size of an abandoned yellow frame.

The network management apparatus 6 can transmit a policy changing request or a policy recovering request 9 to the edge nodes 1, 2, and 3 in accordance with congested states of the core nodes 4, 5 by being connected to the edge nodes 1, 2, and 3 and the core nodes 4, and 5, and periodically receiving the statistical information 8.

Figure 2:
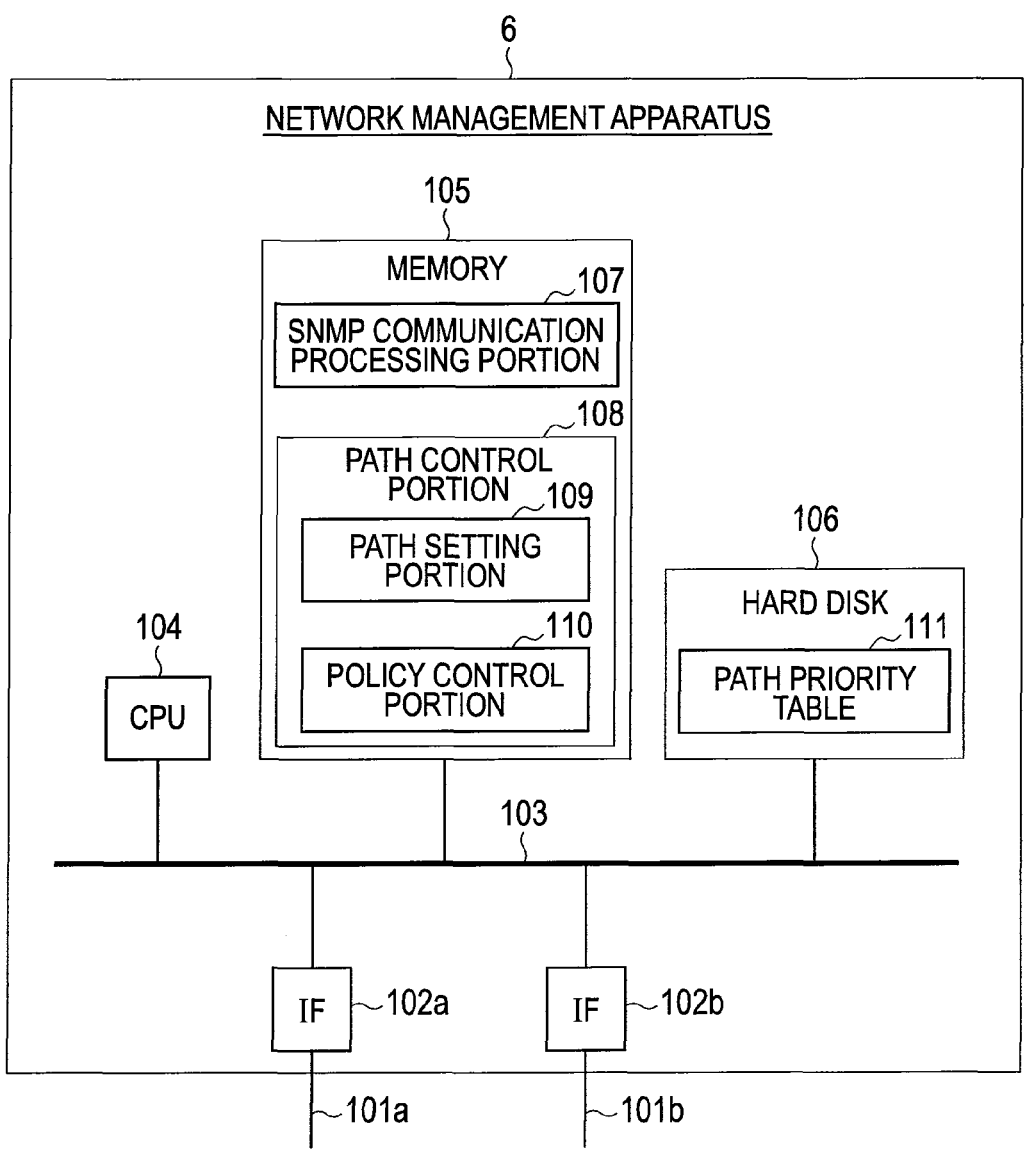
FIG. 2 is a block diagram showing the first embodiment, and showing a constitution of a network management apparatus.

FIG. 2 is a block diagram showing an example of the constitution of the network management apparatus 6. The network management apparatus 6 is constituted by an interface portion (IF) 102 (102a, 102b) accommodating a circuit 101 (101a, 102b) connected to the nodes 1, 2, 3, 4 and 5 constituting the quality assurance network N1, CPU 104, a memory 105, and a hard disk 106. The respective constituent elements are connected by a bus 103.

The memory 105 is stored with an SNMP communication processing portion 107 which is a program of carrying out an SNMP (Simple Network Communication Protocol) communication processing, and a path control portion 108 which is a program of carrying out a path control.

The SNMP communication processing portion 105 has a function of transmitting or receiving an SNMP message to and from the codes 1, 2, 3, 4, and 5 of the quality assurance network N1.

The path control portion 108 is constituted by a path setting portion 109 which is a program of carrying out path setting of the quality assurance network N1, and a policy control portion 110 which is a program of controlling color information providing policies of the edge nodes 1, 2, and 3.

The hard disk 106 is stored with a path priority table 111. The path priority table 111 is a table controlling a priority of a path accommodated by the core nodes 4, and 5, and the operator of the quality assurance network N1 previously sets the table. By controlling the path priority table 111 by the network management apparatus 6, the network management apparatus 6 can select an edge node constituting a transmission destination of a policy changing request or a policy recovering request in accordance with a priority of a path.

FIG. 9 shows an example of a table constitution of the path priority table 111 stored in the network management apparatus 6. The path priority table 111 is stored with information in correspondence with a node ID 401, a threshold of abandoning yellow frame for changing policy 402, a threshold of abandoning yellow frame for recovering policy 403, an accommodated path ID 404, a path priority 405, a color information providing node ID 406, a minimum assurance band 407, a maximum assurance band 408, and a policy change flag 409.

The node ID is an ID uniquely identifying the core node. The threshold of abandoning yellow frame for changing policy 402 is a threshold of a data size of abandoning the yellow frame for determining an acceptability of transmitting a policy changing request to the edge node 1, 2, or 3 by the network management apparatus 6. The threshold of abandoning yellow frame for recovering policy 402 is a threshold of a data size of abandoning the yellow frame for determining an acceptability of transmitting a policy recovering request of the edge node 1, 2, or 3 by the network management apparatus 6. The accommodated path ID 404 is an ID (flow identifier) of uniquely identifying an accommodated path of the core node identified by the node ID 401. The path priority 405 represents a priority of a path, showing that the smaller the value, the higher the priority. In the example of FIG. 9, paths accommodated by the core node 4 are path 1, path 2, and path 3 in an order of higher priorities.

The color information providing node ID 406 is an identifier of an edge node providing the color information to a transferred frame of a path identified by the accommodated path ID 404. The minimum assurance band 407 represents the minimum assurance band (CIR) set to each path identified by the accommodated path ID 404. The maximum assurance band 408 represents the maximum assurance band (PIR) set to each path identified by the accommodated path ID 404.

The policy change flag 409 is a flag for identifying whether the policy used in setting the color information to the frame is being changed, or recovered by the edge node identified by the color information providing node ID 406. The policy change flag 409 is set with FALSE in an initial state. When the network management apparatus 6 transmits a policy changing request to the edge node identified by the color information providing node ID 406, the network management apparatus 6 sets TRUE to the policy change flag 409. Further, when the network management apparatus 6 transmits a policy recovering request to the edge node identified by the color information providing node ID 406, the network management apparatus 6 sets FALSE to the policy change flag 409.

By including the threshold of abandoning yellow frame for changing policy 402, and the threshold of abandoning yellow frame for recovering policy 403 by the path priority table 111, the network management apparatus 6 can transmit the policy changing request or the policy recovering request 9 to the edge nodes 1, 2, and 3 based on a large or small relationship between the threshold of abandoning yellow frame for changing policy 402, and the threshold of abandoning yellow frame for recovering policy 403, and an actual data size of abandoning a yellow frame.

Further, by providing the policy change flag 409 by the path priority table 111, the network management apparatus 6 can grasp whether policies of the edge nodes 1, 2, and 3 are being changed, or recovered.

Figure 4:
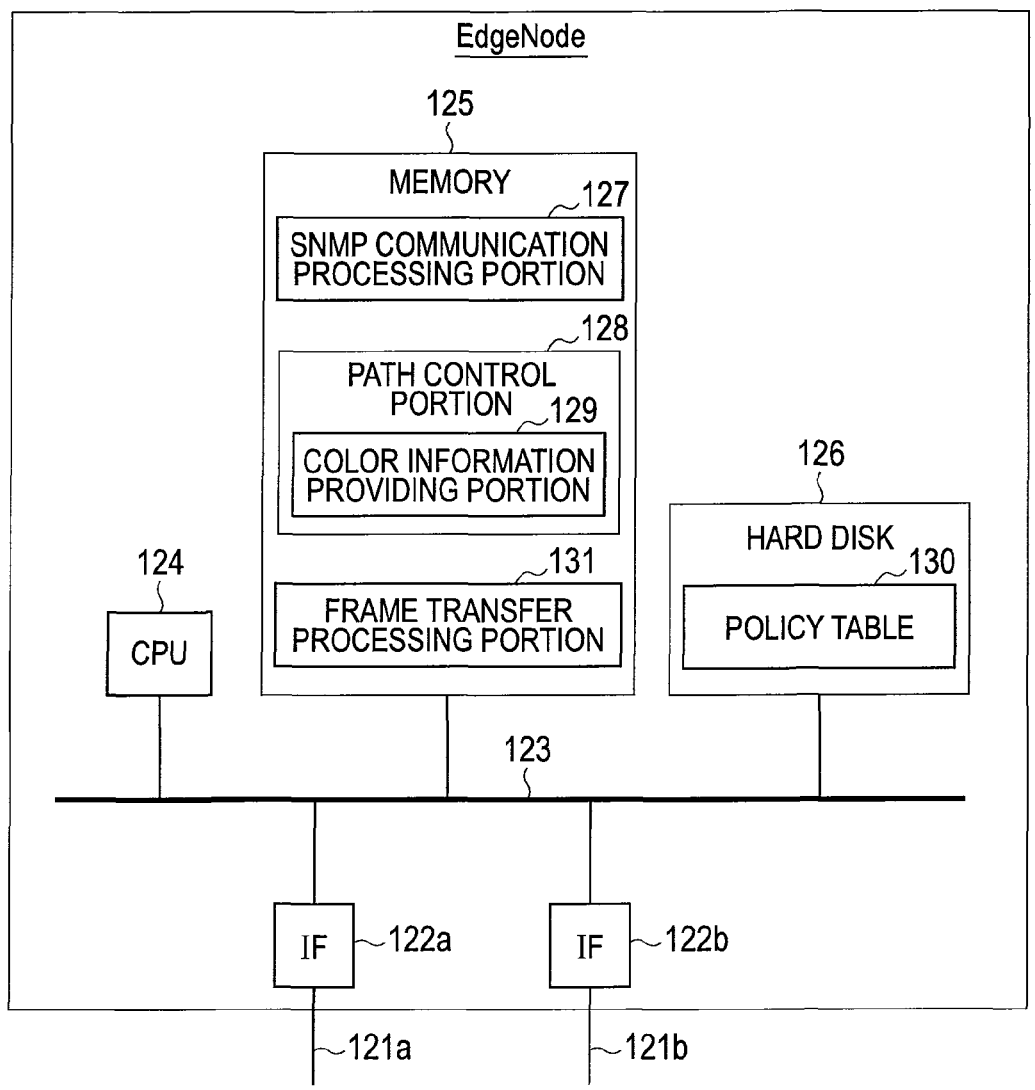
FIG. 4 is a block diagram showing the first embodiment, and showing a constitution of an edge node.

FIG. 4 is a block diagram showing an example of a constitution of the edge node 1, 2, or 3. The edge node 1, 2, or 3 is constituted by an interface portion (IF) 122 (122a, 122b) accommodating a circuit 121 (121a, 121b) connected to the nodes constituting the quality assurance network N1 and the nodes constituting the access networks N2, N3, and N4, CPU 124, a memory 125, and a hard disk 126. The respective constituent elements are connected by a bus 123.

The memory 125 is stored with an SNMP communication processing portion 127 which is a program of carrying out an SNMP communication processing, a path control portion 128 which is a program of carrying out a path control, and a frame transfer processing portion 131 which is a program of carrying out a frame transfer processing.

The SNMP communication processing portion 127 has a function of transmitting or receiving an SNMP message to and from the network management apparatus 6.

The path control portion 128 includes a color information providing portion 129 which is a program of setting color information to a frame. The color information providing portion 129 provides the color information to a frame based on a policy stored by a policy control table 130.

The frame transfer processing portion 131 selects a destination of transferring a frame set with the color information by the color information providing portion 129, and transmits a green frame to the transfer destination more predominantly than a yellow frame. Further, the frame transfer processing portion 131 abandons a red frame.

The hard disk 126 is stored with the policy table 130. The policy table 130 is a table of controlling a policy which is used when the color information is set in changing the policy, and a policy which is used when the color information is set in recovering the policy, which is previously set by the controlling person of the quality assurance network N1.

FIG. 12 shows an example of a table constitution of the policy control table 130 stored in the edge node 1. The policy control table 130 is stored with information in correspondence with a path ID 441, a condition 442, a policy in recovering congestion 443, and a policy in generating congestion 444.

The path ID 441 is an ID uniquely identifying a path allocated to a frame which is set with the color information by the edge node 1. The condition 442 is a condition of determining the color information provided to a frame transferred through a path. The policy control table 130 is stored with 3 ways of conditions of PIR<INR, CIR<INR<PIR, INR<CIR for each path ID 441. The policy in recovering congestion 443 represents color information provided to a frame when the edge node 1 satisfies the condition 442 in recovering a policy. The edge node 1 sets red to a frame in a case of PIR<INR, yellow in a case of CIR<INR<PIR, and green in a case of INR<CIR. The policy in generating congestion 444 represents the color information provided to a frame when the edge node 1 satisfies the condition 442 in changing a policy. The edge node 1 sets red in a case of PIR<INR, and in a case of CIR<INR<PIR, and sets green in a case of INR<CIR.

Also the edge nodes 2 and 3 control the policy control table 130 similarly. In recovering a policy, the edge nodes 2, and 3 set red to a frame in a case of PIR<INR, yellow in a case of CIR<INR<PIR, and green in a case of INR<CIR. Further, in changing a policy, the edge nodes 2, and 3 set red to a frame in a case of PIR<INR, and in a case of CIR<INR<PIR, and green in a case of INR<CIR.

By controlling the color information providing portion 129 and the policy control table 130 by the edge nodes 1, 2, and 3, the color information can be set to a frame by selecting either of the policy in recovering congestion and the policy in generating congestion in accordance with a request for changing a policy or a request for recovering a policy from the network control portion 6.

Figure 6:
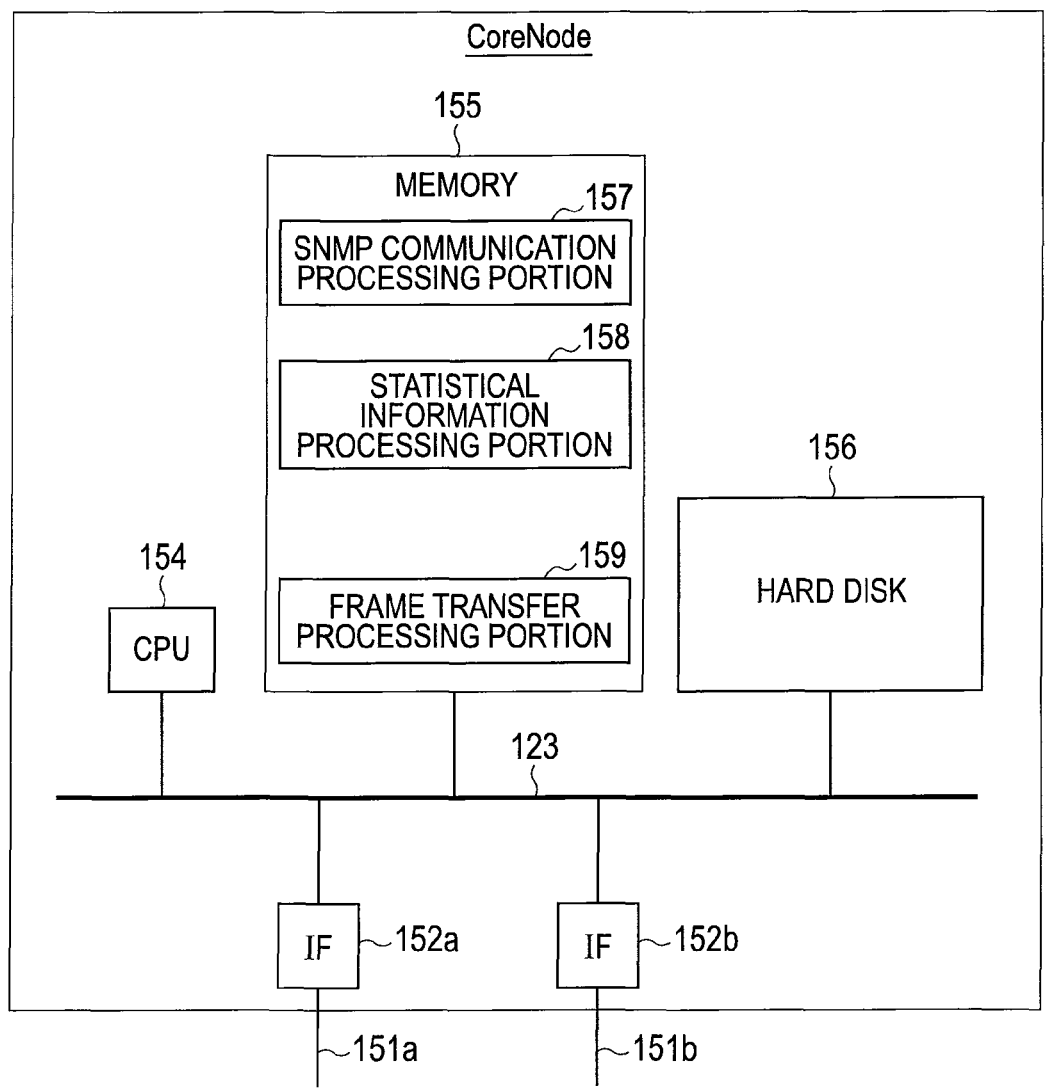
FIG. 6 is a block diagram showing the first embodiment, and showing a constitution of a core node.

FIG. 6 is a block diagram showing an example of a constitution of the core node 4, or 5. The core node 4, or 5 is constituted by an interface portion (IF) 152 (152a, 152b) accommodating a circuit 151 (151a, 151b) connected to the nodes constituting the quality assurance network N1, CPU 154, a memory 155, and a hard disk 156. The respective constituent elements are connected by a bus 153.

The memory 155 is stored with an SNMP communication processing portion 157 which is a program of carrying out an SNMP communication processing, a statistical information processing portion 158 which is a program of carrying out a statistical information processing, and a frame transfer processing portion 159 which is a program of carrying out a frame transfer processing.

The SNMP communication processing portion 157 has a function of transmitting or receiving an SNMP message to and from the network management apparatus 6.

The statistical information processing portion 158 is stored with a processing program for transmitting the statistical information 8 of traffic processed by the core node 4 or 5 at every constant time period. The statistical information 8 is information of traffic processed by the core node 4, or 5, including the transfer traffic data size, the data size of the abandoned green frame, and the data size of the abandoned yellow frame.

The frame transfer processing portion 159 selects a destination of transferring a received frame based on the label 427, and transmits a frame to the selected transfer destination. The frame transfer processing portion 159 transfers a green frame to the transfer destination more predominantly than a yellow frame.

By providing the statistical information processing portions 158 to the core nodes 4, and 5, and transmitting the statistical information to the network management apparatus 6 at every constant time period, the network management apparatus 6 can monitor congested states of the core nodes 4, and 5.

Figure 17:
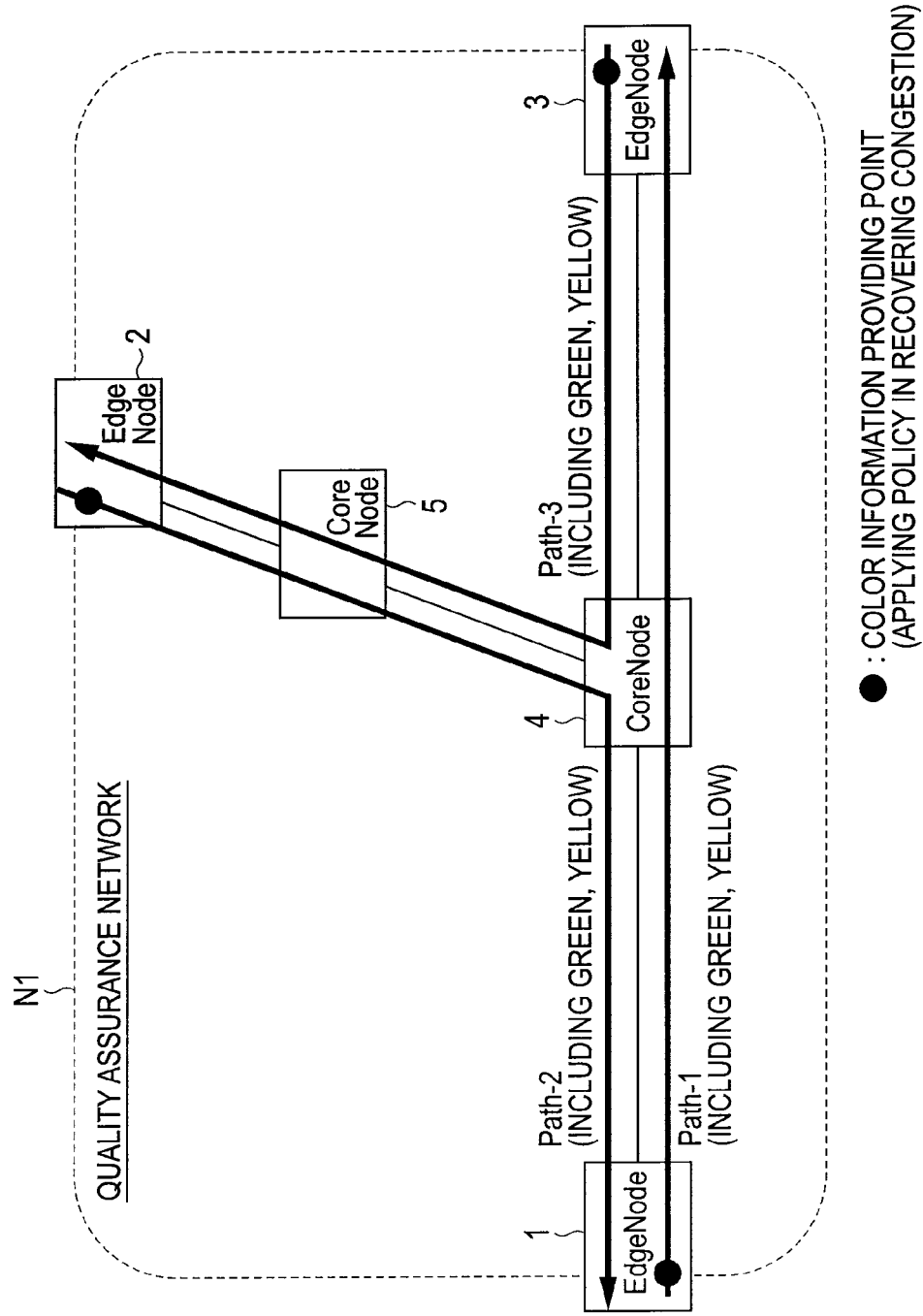
FIG. 17 is an explanatory view showing the first embodiment, and showing an example of a content of a colored frame transferred by respective paths.

FIG. 17 shows a content of a colored frame transferred in a path accommodated by the core node 4 when all of the edge nodes 1, 2, and 3 are recovering policies. Traffics of all of the paths 1, 2, and 3 accommodated by the core node 4 include a green frame, and a yellow frame. When the core node 4 is brought into a congested state by increasing traffics processed by the core node 4, the core node 4 abandons the yellow frame of the path 1, 2, or 3.

An explanation will be given of a procedure in which the network management apparatus 6 transmits requests for changing policies to the edge nodes 2, and 3, and the edge nodes 2, and 3 change the policies when the core nodes 4 is brought into a congested state in a state of FIG. 17 in accordance with sequences shown in FIG. 13, and FIG. 14.

The core node 4 transmits statistical information 680 to the network management apparatus 6 periodically by a processing of the statistical information processing portion 159 (600). The statistical information 680 includes the data size of the transfer traffic of the core node 4, the data size of the abandoned green frame, and the data size of the abandoned yellow frame.

Figure 7:
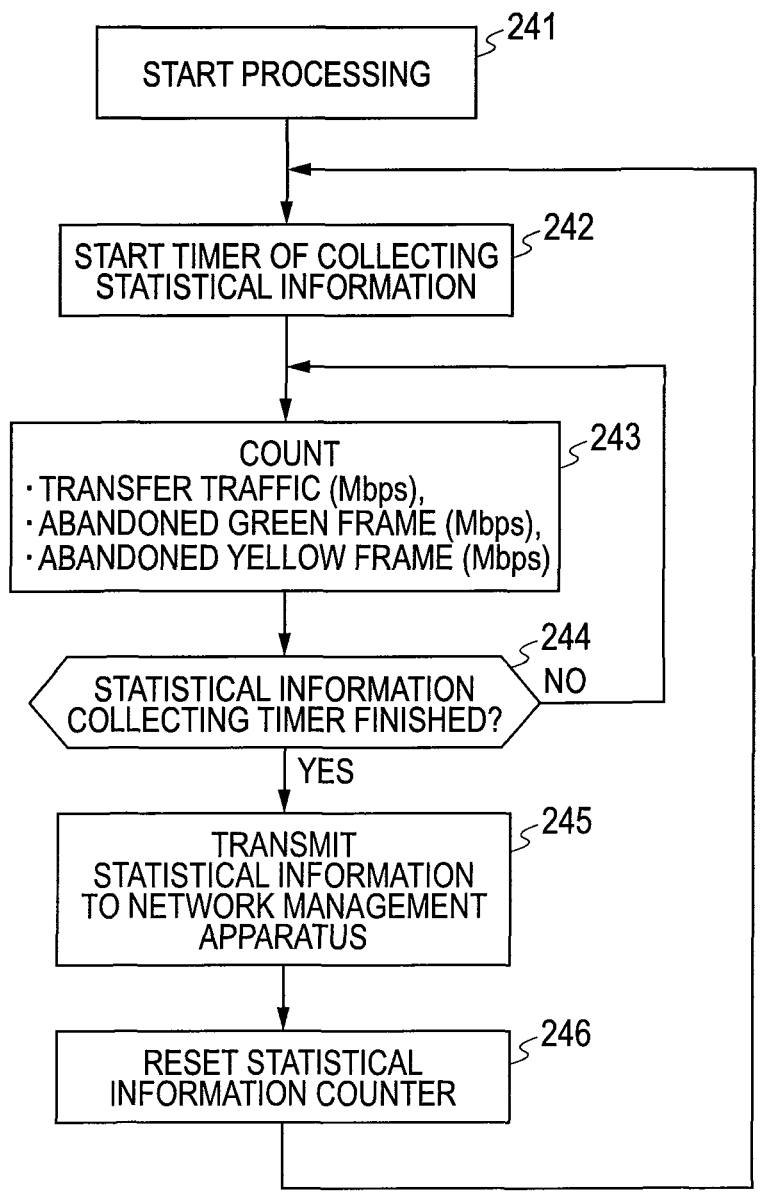
FIG. 7 is a flowchart showing the first embodiment, and showing an example of a processing of a statistical information processing portion.

FIG. 7 shows respective steps of the statistical information processing portions 159 provided to the core nodes 4, and 5. In FIG. 7, after start processing (241), a statistical information collecting timer is started (242). The statistical information collecting timer is finished after an elapse of a time period by which the core nodes 4 and 5 transmit statistical information to the network management apparatus 6. During a time period until finishing the statistical information collecting timer, the core nodes 4 and 5 count up the data size of the transfer traffic, the data size of the abandoned green frame, and the data size of the abandoned yellow frame respectively as statistical information (243). Successively, when the statistical information collecting timer is finished (244), the core nodes 4, and 5 transmit the counted-up statistical information to the network management apparatus 6 (245). Further, counters of the data size of the transfer traffic, the data size of the abandoned green frame, and the data size of the abandoned yellow frame are reset (246), and the statistical information collecting timer is restarted (242). The core nodes 4 and 5 transmit the statistical information periodically to the network management apparatus 6 by repeating the above-described processing.

Referring back to FIG. 13, when the core node 4 is brought into a congested state by increasing the processing traffic of the core node 4 (601), the network management apparatus 6 detects that a data size of abandoning the yellow frame included in statistical information 602 received from the core node 4 exceeds a threshold of abandoning the yellow frame for changing the policy at inside of the path priority table a111 shown in FIG. 9 (603). Successively, the network management apparatus 6 transmits a policy changing request to the edge node 3 which is a node of providing color information of a path having the least priority accommodated by the core node 4 (604). The policy changing request 604 includes an ID of identifying the path 3 which is a path constituting an object of changing the policy.

Figure 3:
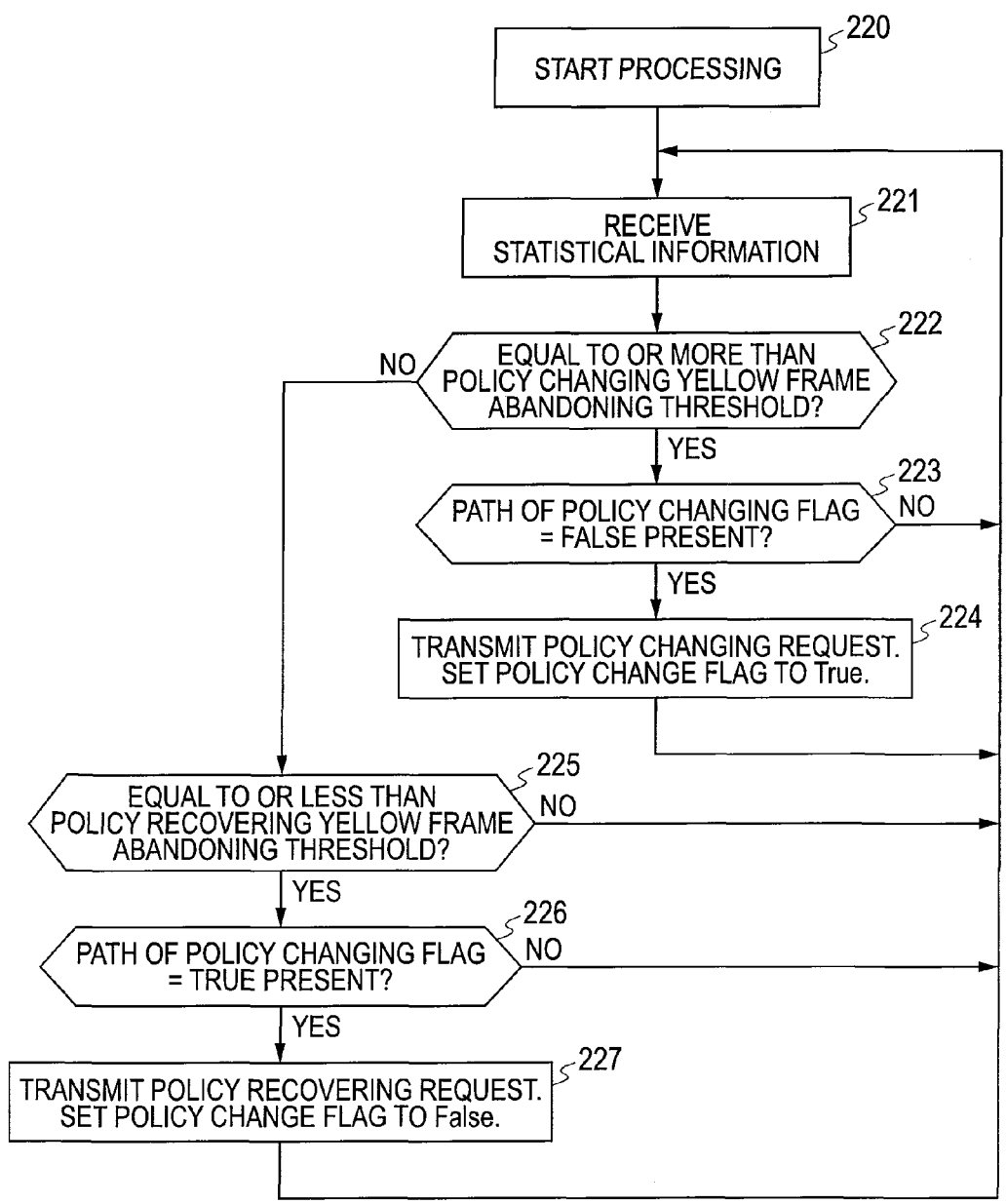
FIG. 3 is a flowchart showing the first embodiment, and showing an example of a processing of a policy control portion.

FIG. 3 shows respective steps of the policy control portion 110 provided to the network management apparatus 6. In FIG. 3, after start processing (220), when the statistical information is received from the core node 4, or 5 (221), the network management apparatus 6 compares the data size of abandoning the yellow frame included in the statistical information, and the policy changing yellow frame abandoning threshold 402 set to the path priority table a111 shown in FIG. 9 (222). When the yellow frame abandoning data size is equal to or more than the policy changing yellow frame abandoning threshold 402, the network management apparatus 6 confirms whether a path set with FALSE in the policy change flag is present in reference to the path priority table a111 (223).

When the path set with FALSE in the policy changing flag is not present, the network management apparatus 6 awaits for receiving next statistical information (221).

On the other hand, when the path set with FALSE in the policy change flag is present, the network management apparatus 6 transmits the policy changing request to the edge node 3 identified by the color information attaching node ID 406 corresponded to the path of the least path priority (405). Further, the network management apparatus 6 sets the policy change flag in correspondence with the edge node 3 to TRUE. As a result thereof, the path priority table is changed from a state of the path priority table a111 shown in FIG. 9 to a state of a path priority table b111 shown in FIG. 10. Upon completion of the above-described processing, a response from the edge node 3 is received, and the network management apparatus 6 waits for receiving next statistical information (221).

Figure 5:
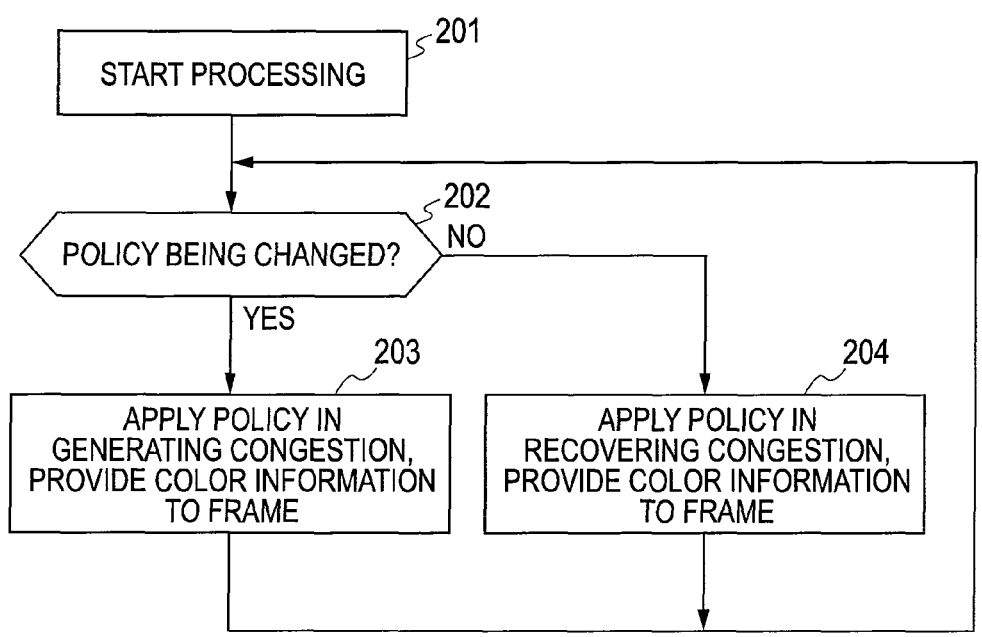
FIG. 5 is a flowchart showing the first embodiment, and showing an example of a processing of a color information providing portion.

Referring back to FIG. 13, when the policy changing request 604 is received from the network management apparatus 6, the edge node 3 changes a color information providing policy from a policy in recovering congestion 443 controlled by the policy change table 130 to a policy in generating congestion 443, and transmits a response 606 to the network management apparatus 6. The edge node 3 provides color information to a frame by applying the policy in recovering congestion 443 in a case of recovering a policy by a processing of the color information providing portion 429 shown in FIG. 5 (204). On the other hand, in a case of changing a policy, the edge node 3 provides color information to a frame by applying a policy in generating congestion 444 (203).

The edge node 3 changes color information set in a case of CIR<INR<PIR from yellow to red for a frame transmitting through the path 3 by changing the color information providing policy from the policy in recovering congestion 443 to the policy in generating congestion 444. Further, the edge node 3 abandons the red frame without transferring the red frame by the path of path 3 by a processing of the frame transfer processing portion 131.

Figure 18:
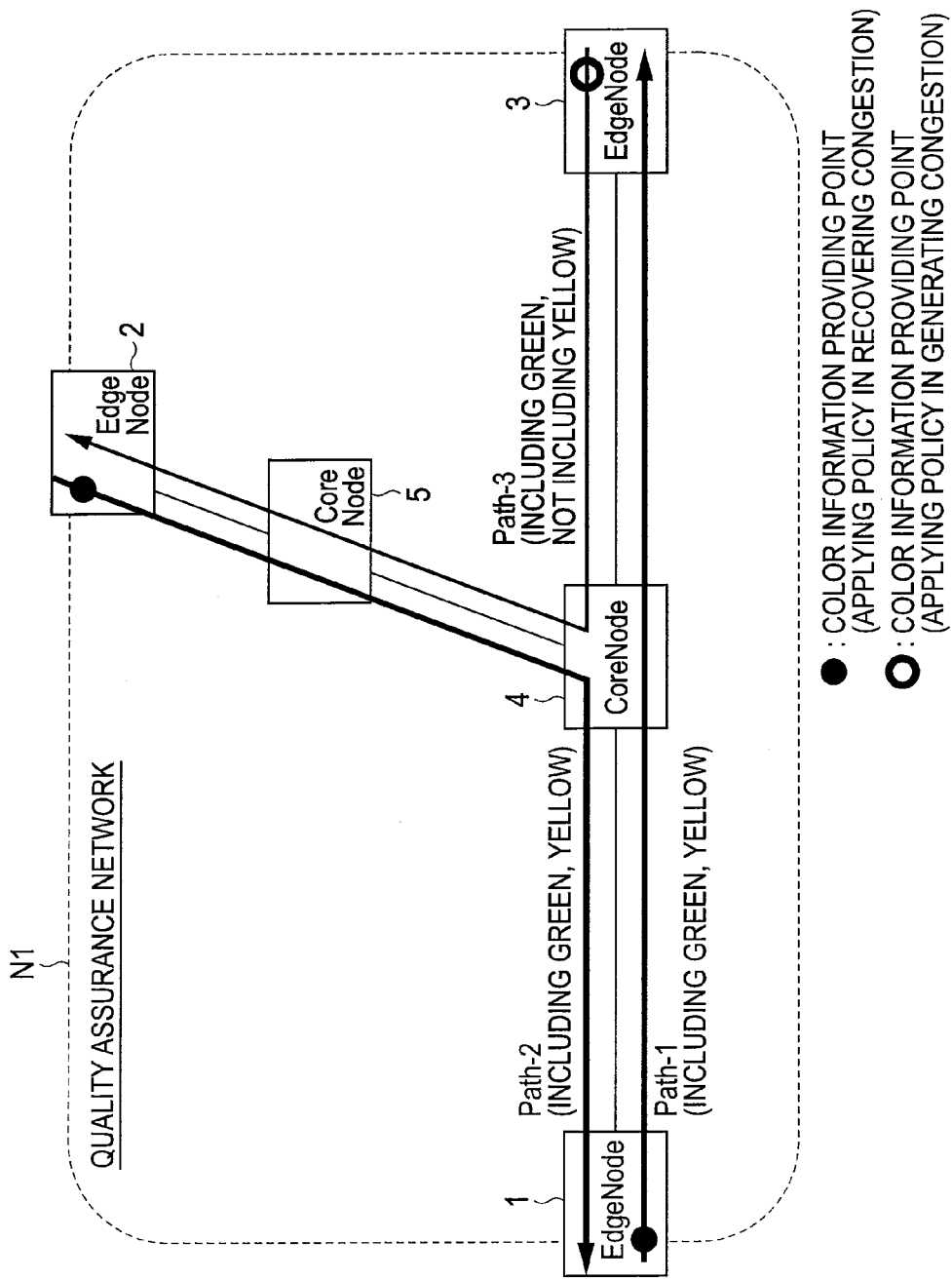
FIG. 18 is an explanatory vide showing the first embodiment, and showing other example of a content of a colored frame transferred by respective paths.

FIG. 18 shows a content of a colored frame transferred in a path accommodated in the core node 4 when the edge node 3 changes the color information providing policy. In path 3, the edge node 3 does not transfer the yellow frame to the core node 4, but transfers only the green frame thereto. That is, an amount of transfer traffic of path 3 is reduced. As a result thereof, the yellow frame of the low priority path 3 can be reduced while reducing abandonment of the yellow frame of the high priority paths 1, and 2. Thereby, the congestion of the core node 4 can be recovered while maintaining a service quality provided by the high priority paths 1, and 2.

Referring back to FIG. 13, even after recovering the congestion of the core node 4 (607), the core node 4 continues transmitting the statistical information 608, 609, 610 periodically to the network management apparatus 6.

Successively, an explanation will be given of a procedure in which the network management apparatus transmits a policy changing request to the edge node 2, and the edge node 2 changes a policy when traffic processed by the core node 4 is further increased, and a congestion is generated at the core node 4 in accordance with a sequence shown in FIG. 14.

When the core node 4 is brought into a congested state by an increase in traffic processed by the core node 4 (631), the network management apparatus 6 detects that the data size of the abandoned yellow frame in statistical information 632 received from the core node 4 exceeds the threshold of abandoning yellow frame for changing policy 402 in the path priority table a111 shown in FIG. 9 (633). Successively, the network management apparatus 6 confirms a node of providing color information of the path 2 having the least priority set with FALSE at the policy change flag 409 in paths accommodated by the core node 4 in reference to the path priority table b111 by a processing of the policy control portion 110. Further, the network management apparatus 6 transmits a policy changing request to the edge node 2 which is the node of providing the color information (635). The policy changing request 635 includes an identification ID of the path 2 which is a path constituting an object of changing a policy. Further, the network management apparatus 6 changes the policy change flag 409 corresponded to the path to TRUE. As a result thereof, the path priority table is changed from a state of the path priority table b111 shown in FIG. 10 to a state of a path priority table c111 shown in FIG. 11.

When the edge node 2 receives a policy changing request 634 from the network management apparatus 6, the edge node 2 changes the color information attaching policy from the policy in recovering congestion 443 controlled by the policy change table 130 to the policy in generating congestion 444, and transmits a response 636 to the network management apparatus 6. As a result thereof, when the edge node 2 sets the color information, the edge node 2 changes the color information set to the transfer frame of the path 2 in a case of constituting CIR<INR<PIR from yellow to red. Further, the edge node 2 does not transfer the red frame by the path of path 2 but abandons the red frame by the processing of the frame transfer processing portion 131.

Figure 19:
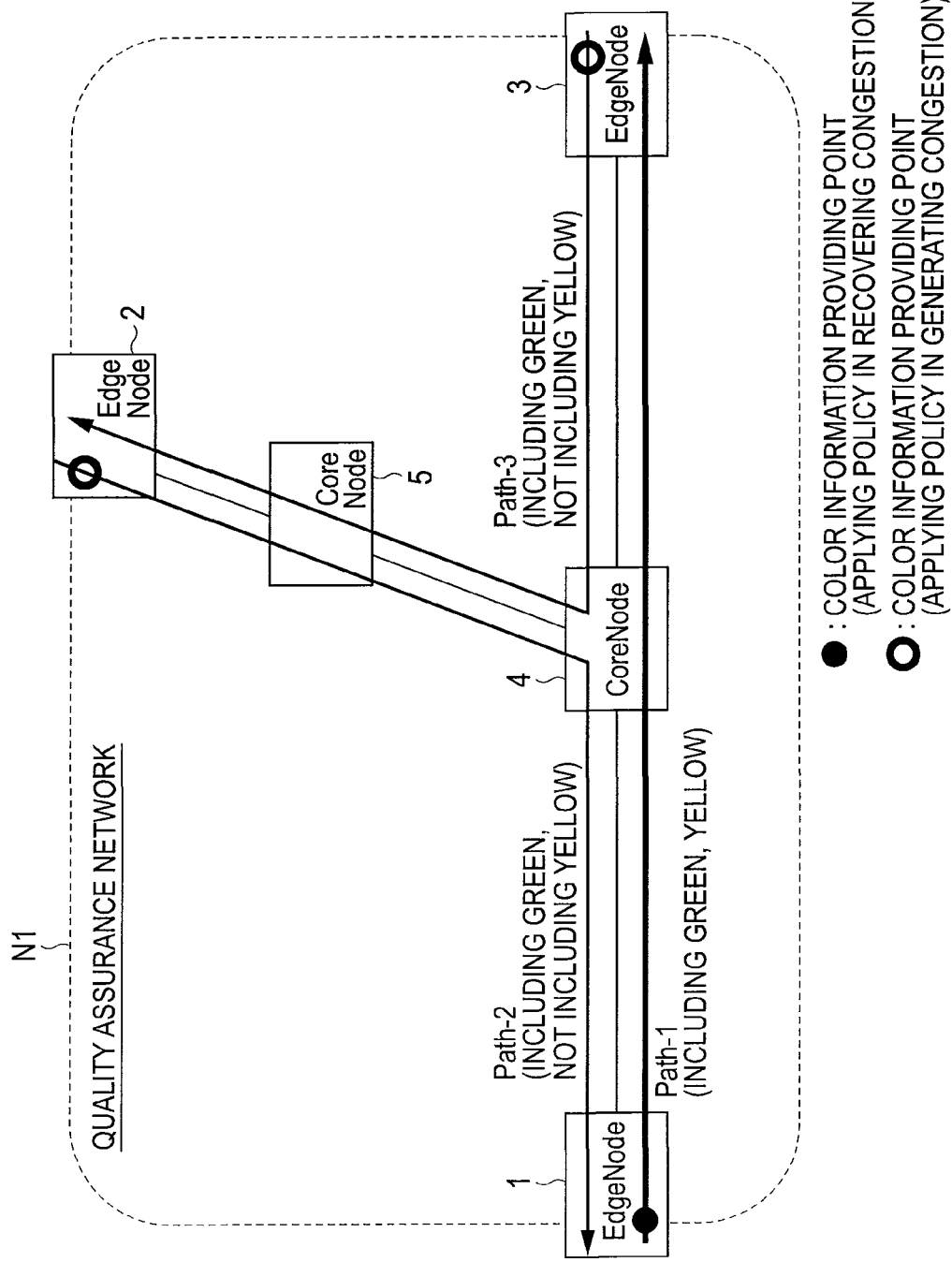
FIG. 19 is an explanatory diagram showing the first embodiment, and showing other example of a content of a colored frame transferred by respective paths.

FIG. 19 shows a content of a colored frame transmitted in the accommodated path of the core node 4 when the edge node 2 changes the color information providing policy. In path 2, the edge node does not transmit the yellow frame to the core node 4, but transmits only the green frame. That is, an amount of traffic transmitted through the path 2 is reduced. As a result thereof, the yellow frames of the low priority paths 2, and 3 can be reduced while reducing abandonment of the yellow frame of the high priority path 1. Thereby, the congestion of the core node 4 can be recovered while maintaining the service quality provided by the high priority path 1.

Figure 13:
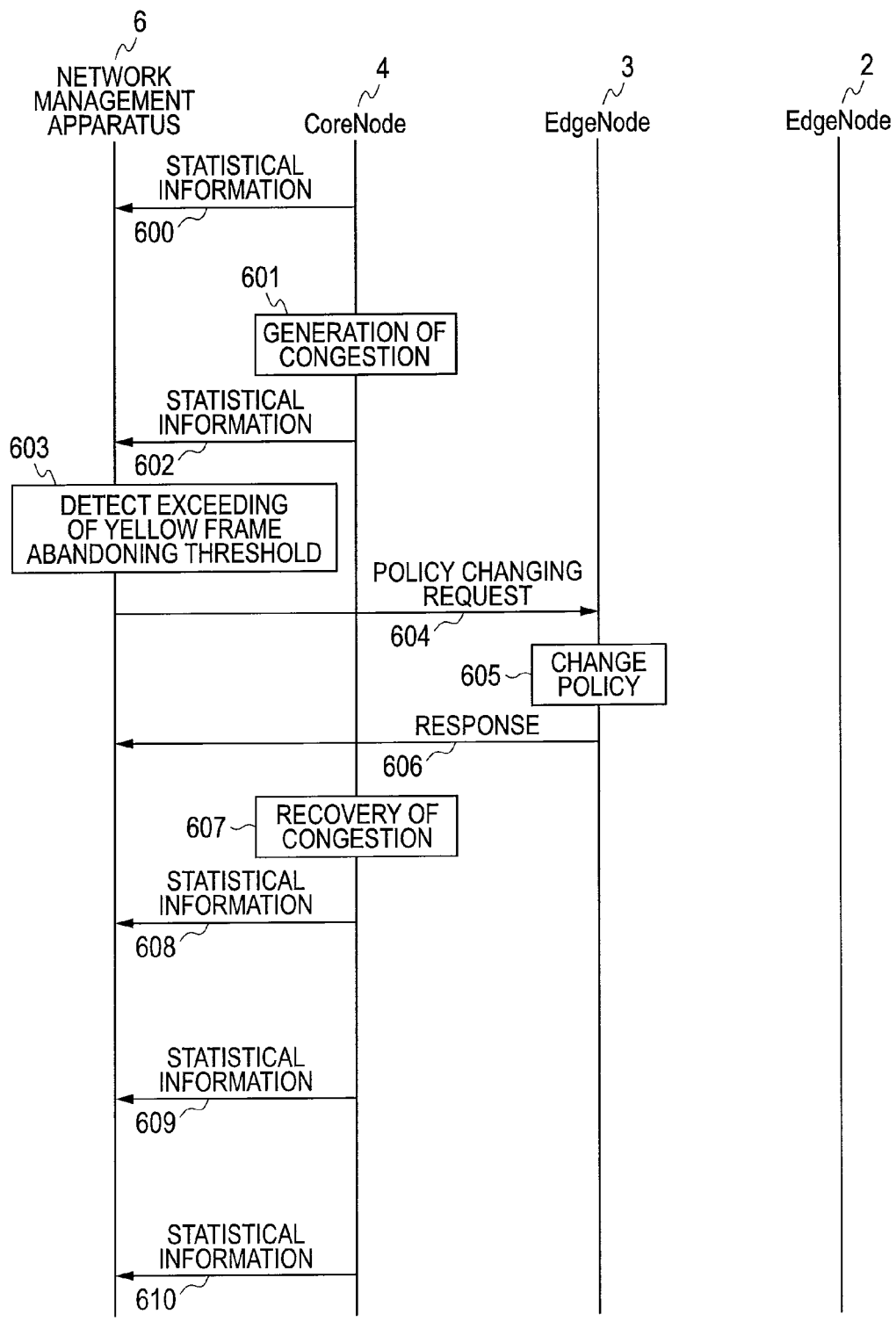
FIG. 13 is a sequence diagram showing the first embodiment, and changing a color information providing policy in accordance with a congested state of a node.
Figure 14:
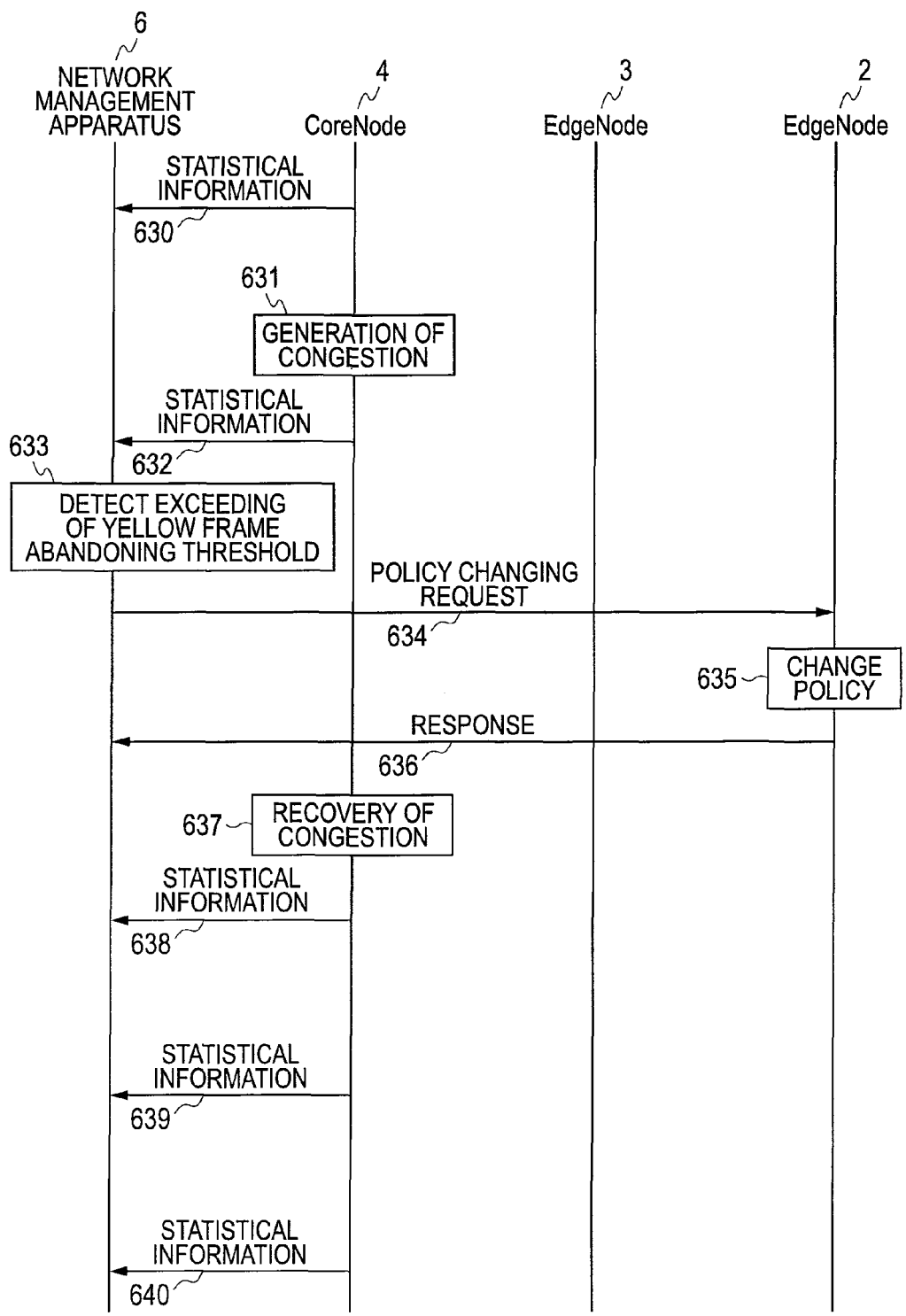
FIG. 14 is a sequence diagram showing the first embodiment, and showing other example of changing the color information providing policy in accordance with a congested state of a node.

By processings explained in the sequences of FIG. 13, and FIG. 14, in the path accommodated in the core node 4, even when the traffic is increased in steps, the color information providing policies of the edge nodes 1, 2, and 3 can be changed by following the congested state of the core node 4. Thereby, the congestion of the core node can be recovered while maintaining the quality of the service provided by the path having the high priority in accordance with the congested state of the core node 4.

Successively, an explanation will be given of a processing procedure when traffic processed by the core node 4 is reduced, in accordance with the sequences shown in FIG. 15, and FIG. 16.

When the data size of abandoning the yellow frame included in statistical information 662 becomes equal to or less than the threshold of abandoning yellow frame for recovering policy 403 set in the path priority table c111, the policy control portion 110 provided to the network management apparatus 6 carries out a processing of transmitting a policy recovering request to the edge node.

In processing steps of the policy control portion 110 shown in FIG. 3, when the data size of abandoning the yellow frame is equal to or less than the threshold of abandoning yellow frame for changing policy 402 (222), the network management apparatus 6 compares the data size of abandoning the yellow frame and the threshold of abandoning yellow frame for recovering policy 403. When the data size of abandoning the yellow frame becomes equal to or more than the threshold of abandoning yellow frame for recovering policy 403, the network management apparatus 6 is brought into a state of awaiting for receiving statistical information (221).

On the other hand, when the data size of abandoning the yellow frame becomes equal to or less than the threshold of abandoning yellow frame for recovering policy 403, the network management apparatus 6 confirms whether a path set with TRUE in the policy change flag is present (226). When the path set with TRUE in the policy changing flag is not present, the network management apparatus 6 is brought into a state of waiting for statistical information (221).

On the other hand, when the path set with TRUE in the policy change flag is present, the network management apparatus 6 transmits a policy recovering request to the edge node 2 identified by the color information providing node ID 406 corresponded to the path having the highest path priority (405). Further, the network management apparatus 6 sets the policy change flag in correspondence with the edge node 2 to FALSE. As a result thereof, the path priority table is changed from a state of the path priority table c111 shown in FIG. 11 to a state of the path priority table b111 shown in FIG. 10. After having carried out the above-described processing, a response from the edge node 2 is received, and the network management apparatus 6 is brought into a state of waiting for next statistical information (221).

Referring back to FIG. 15, when the edge node 2 receives a policy recovery request 664 from the network management apparatus 6, the edge node 2 changes the color information providing policy from the policy in generating congestion 444 controlled by the policy change table 130 to the policy in recovering congestion 443, and transmits a response 666 to the network management apparatus 6. By changing the color information providing policy from the policy in generating congestion 444 to the policy in recovering congestion 443, the edge node 2 changes the color information set in a case of constituting CIR<INR<PIR from red to yellow for a frame transferred through Path 2.

FIG. 18 shows a content of a colored frame transferred in a path accommodated by the core node 4 when the edge node 2 changes the color information providing policy to the policy in recovering congestion 443. At path 2, the edge node 2 transfers not only the green frame but the yellow frame to the core node 4. Thereby, a quality of a service provided by path 2 can be recovered by following a reduction in an amount of traffic processed by the core node 4.

Even after recovering the color information providing policy of the edge node 2, the network management apparatus receives statistical information 667, 668, 669, 680 periodically from the core node 4. Further, when the traffic processed by the core node 4 is further reduced, and the data size of abandoning the yellow frame becomes equal to or less than the threshold of abandoning yellow for recovering policy 403

Figure 15:
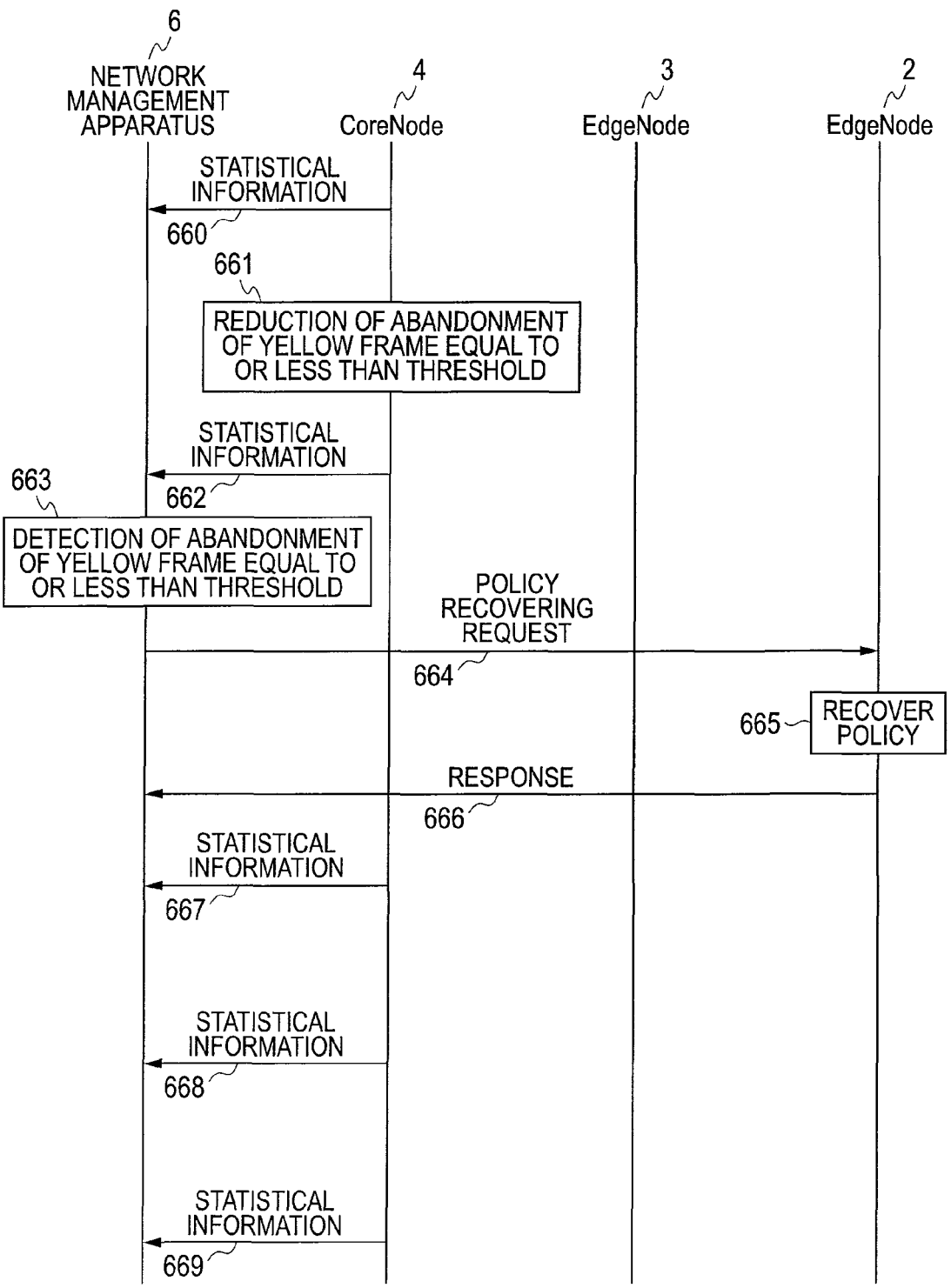
FIG. 15 is a sequence diagram showing the first embodiment, and showing an example of recovering the color information providing policy in accordance with a congested state of a node.

(681), the network management apparatus 6 transmits the policy recovering request to the edge node 3 by a procedure similar to that of FIG. 15. Further, the path priority table controlled by the network management apparatus 6 is changed from the state of the path priority table b111 shown in FIG. 10 to the state of the path priority table a111 shown in FIG. 9.

The edge node 3 changes the color information providing policy from the policy in generating congestion 444 to the policy in recovering congestion 443, and transmits a response 686 to the network management apparatus 6 by a processing similar to that of the edge node 2 in FIG. 15.

FIG. 17 shows a content of a colored frame transferred in a path accommodated in the core node 4 as a result of the above-described processing. In path 3, the edge node 3 transmits not only the green frame but the yellow frame to the core node 4. Thereby, a quality of a service provided by path 3 can be recovered by following a reduction in an amount of traffic processed by the core node 4.

According to the first embodiment of the present invention, in accordance with the congested state of the core node 4, the color information providing policy is changed from the policy in recovering congestion 443 to the policy in generating congestion 444 only in the low priority path. As a result thereof, the congestion of the core node 4 can be reduced by reducing the traffic transferred in the low priority path while maintaining the service quality provided in the high priority path.

Further, the abandonment of the yellow frame in the core node 4 is reduced, and therefore, the amount of abandoning the yellow frame at the midway of passing the T-MPLS network is reduced, and the band can effectively be utilized.

Further, the network management apparatus 6 receives the statistical information periodically from the core node 4, and transmits the policy changing request or the policy recovering request to the edge nodes 1, 2, and 3 in accordance with the congested state of the core node 4. Thereby, even when the traffic processed by the core node 4 is changed in steps, the congestion of the core node can be reduced by reducing the traffic in the low priority path by following the congested state of the core node 4.

Second Embodiment

An explanation will be given of a second embodiment of the present invention in reference to the drawings. The second embodiment is characterized in that the path priority table 111 provided to the network management apparatus 6 controls a threshold of abandoning a yellow frame for changing a policy and a threshold of abandoning a yellow frame for recovering a policy respectively in two stages.

FIG. 21 shows an example of a path priority table 111d in the second embodiment. In the second embodiment, the operator of the quality assurance network N1 previously sets two stages of thresholds of 1 path, and 2 path respectively to each of a threshold of abandoning yellow frame for changing policy 461, and a threshold of abandoning yellow for recovering policy 462.

Figure 23:
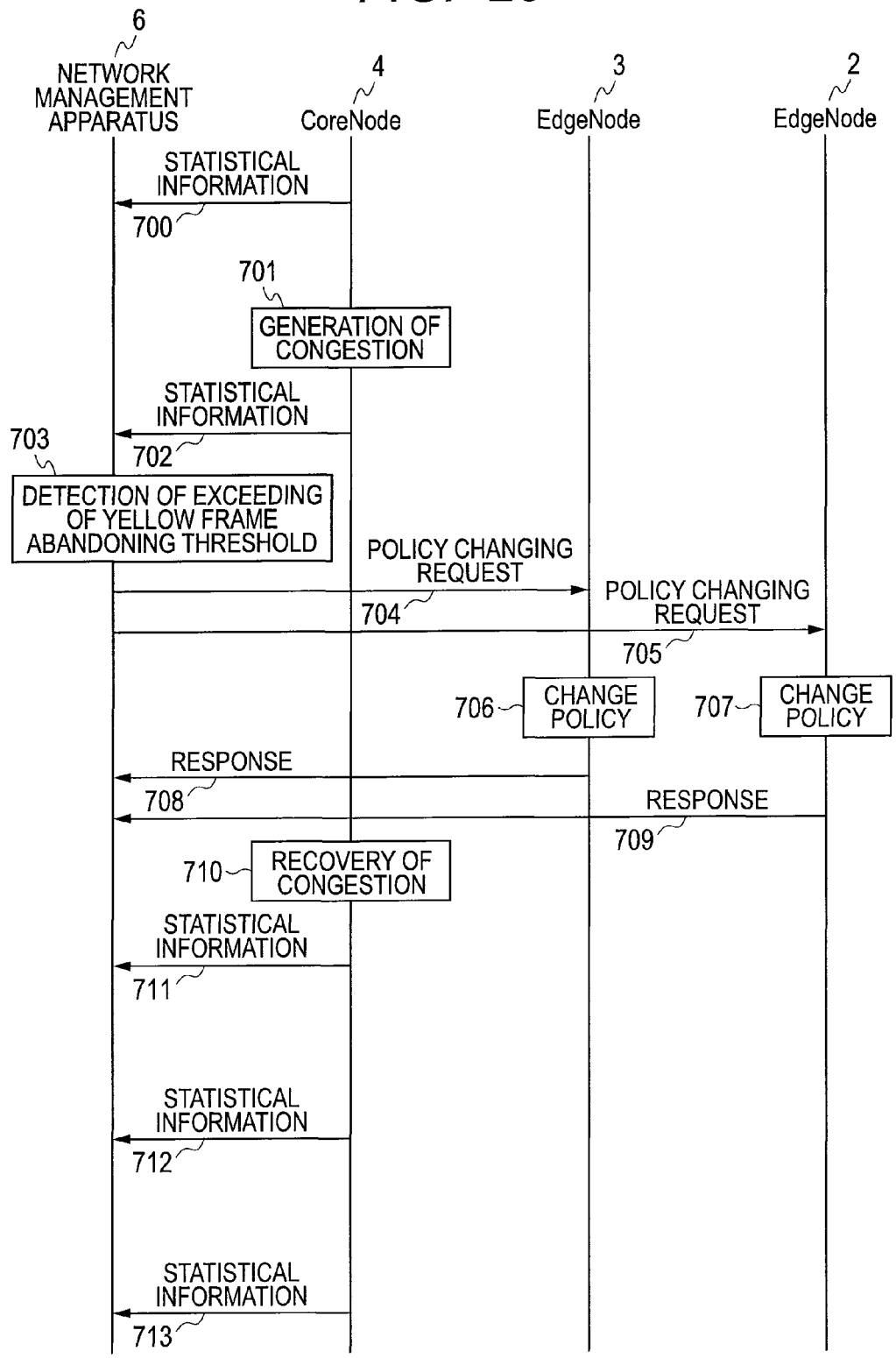
FIG. 23 is a sequence diagram showing the second embodiment, and changing a color information providing policy in accordance with a congested state of a node.

An explanation will be given of a procedure in which when the core node 4 is brought into the congested state in a state of FIG. 17, the network management apparatus 6 transmits policy changing requests to the edge nodes 2, and 3, and the edge nodes 2, and 3 change policies in accordance with a sequence of FIG. 23.

When the network management apparatus 6 receives statistical information 702 from the core node 4, the network management apparatus 6 compares the data size of abandoning the yellow frame included in the statistical information 702, and the threshold of abandoning yellow frame for changing policy 461 (2 path) by the processing of the policy control portion 110.

Figure 20:
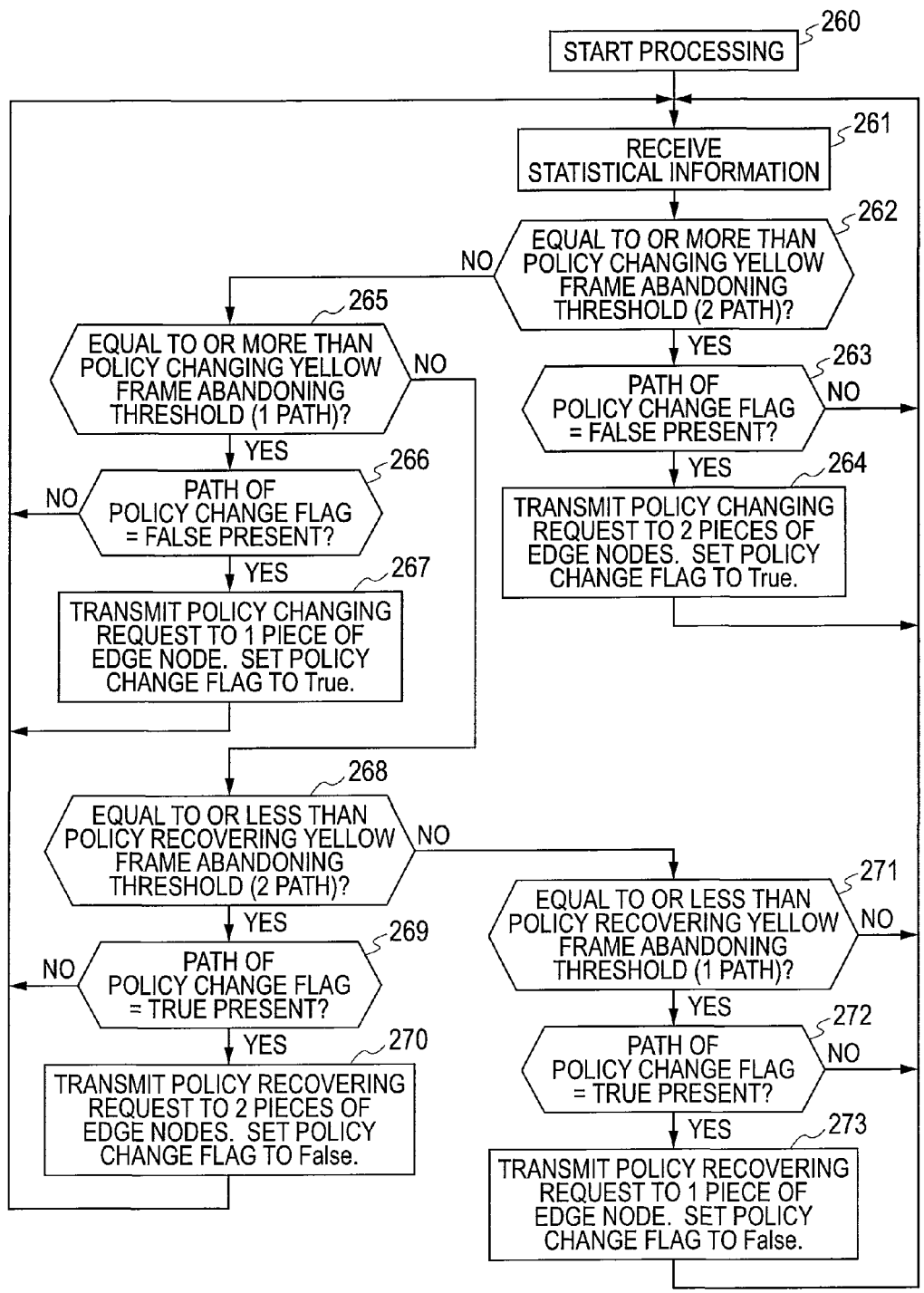
FIG. 20 is a flowchart showing a second embodiment, and showing an example of a processing of a policy control portion.

FIG. 20 shows respective steps of the policy control portion 110 provided to the network management apparatus 6 according to the second embodiment. When the network management apparatus 6 receives statistical information from the core node 4, or 5 (261) after starting processing (260), the network management apparatus 6 compares a data size of abandoning the yellow frame included in the statistical information, and the threshold of abandoning yellow for changing policy 461 (2 path). When the data size of abandoning the yellow frame is equal to or more than the threshold of abandoning yellow frame for changing policy 461 (2 path), the network management apparatus 6 confirms whether FALSE is set to the policy change flag 468 (263). When the path set with FALSE at the policy change flag 468 is not present, the network management apparatus is brought into a state of waiting for receiving next statistical information (261).

On the other hand, when the path set with FALSE at the policy changing flag 468 is present, the network management apparatus 6 transmits policy changing requests to color information providing nodes 465 corresponded to two paths having the least priority set with FALSE at policy change flags 468. Further, when only one of the path set with FALSE at the policy change flag 468 is present, the network management apparatus 6 transmits the policy changing request only to the color information providing node 465 corresponded to the path. Thereafter, the network management apparatus 6 receives response(s) from the color information providing node(s) 465 and the network management apparatus is brought into the state of waiting for receiving next statistical information (261).

At the step 262, when the data size of abandoning the yellow frame is equal to or smaller than the threshold of abandoning yellow frame for changing policy 461 (2 path), the network management apparatus 6 compares the data size of abandoning the yellow frame and the threshold of abandoning yellow frame for changing policy 461 (1 path). When the data size of abandoning the yellow frame is equal to or more than the threshold of abandoning yellow for changing policy 461 (1 path), processings the same as those of processing steps 223, and 224 of FIG. 3 according to the first embodiment are carried out.

Referring back to FIG. 23, when the data size of abandoning the yellow frame is equal to or more than the threshold of abandoning yellow frame for changing policy 461 (2 path), the network management apparatus 6 transmits policy changing requests 704, and 705 to the edge nodes 2, and 3 corresponded to two paths having the least priority set with FALSE at the policy change flags 468. Further, the network management apparatus 6 sets TRUE to policy change flags corresponded to the paths 2, and 3 of the path priority table 111d. As a result thereof, the path priority table controlled by the network management apparatus 6 is changed from a state of the path priority table 111d shown in FIG. 21 to a state of a path priority table 111e shown in FIG. 22.

The edge nodes 2 and 3 change policies and transmit responses to the network management apparatus 6 by the processing procedures of FIG. 13 and FIG. 14 according to the first embodiment.

FIG. 19 shows a content of a colored frame transmitted in a path accommodated in the core node 4 as a result of the above-described processing. In paths 2, and 3, the edge nodes 2, and 3 do not transmit the yellow frames to the core node 4, but transmit only the green frames. That is, traffics transferred by the paths 2 and 3 are reduced, and the congestion of the core node 4 is reduced while maintaining the quality of a service provided by the high priority path 1.

By transmitting the policy changing requests simultaneously to the edge nodes 2, and 3 by the network management apparatus 6, the core node 4 can reflect a rapid increase in traffic swiftly to the color information providing policies of the edge nodes 2, and 3. As a result thereof, a time period required until recovering the congestion of the core node 4 can be reduced.

Figure 24:
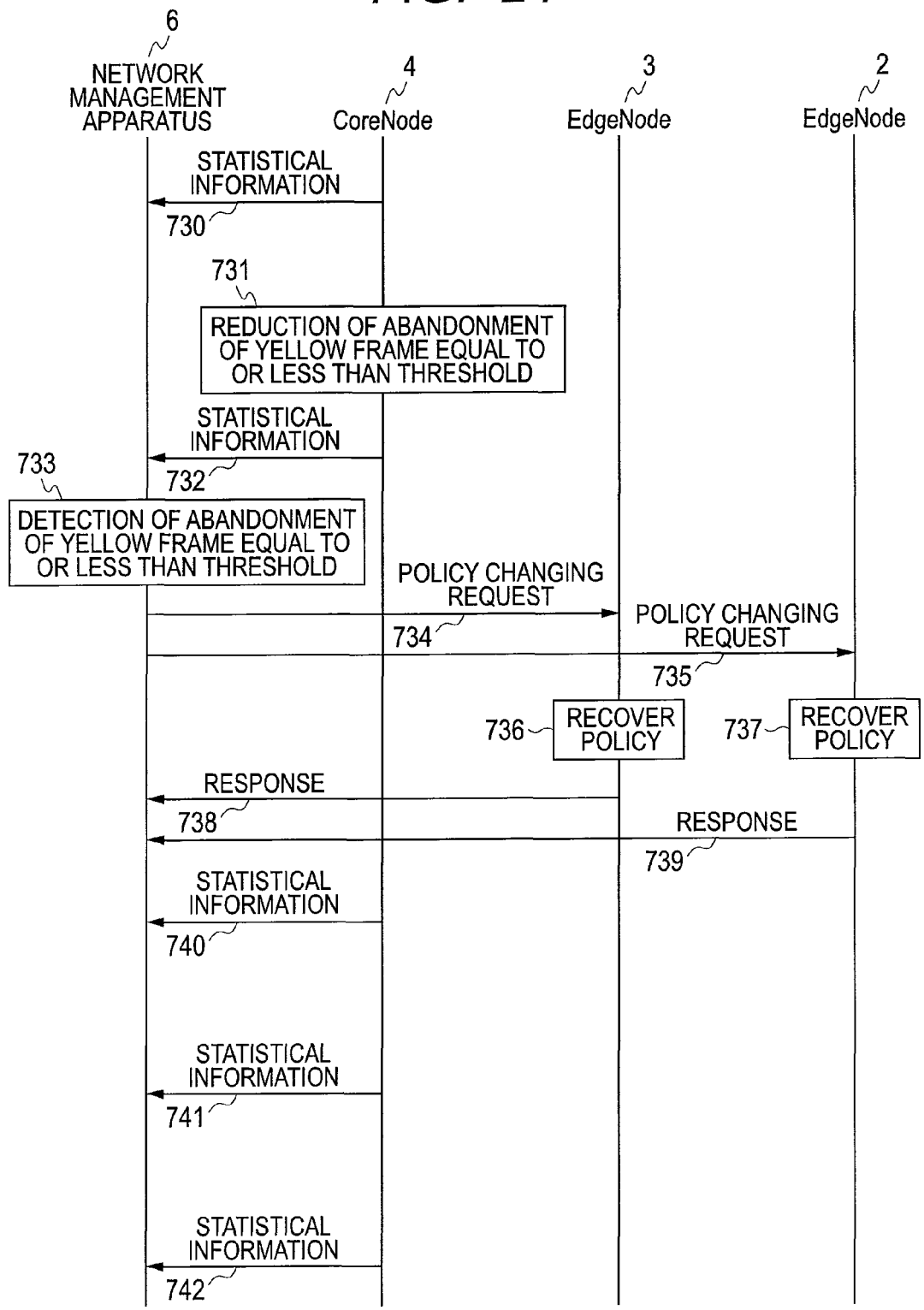
FIG. 24 is a sequence diagram showing the second embodiment, and showing other example of changing the color information providing policy in accordance with a congested state of a node.

Successively, an explanation will be given of a processing procedure when traffics of paths 1, 2, and 3 accommodated in the core node 4 in the state of FIG. 19 is reduced in accordance with a sequence of FIG. 24.

When the network management apparatus 6 receives statistical information 732 from the core node 4, the network management apparatus 6 compares a data size of abandoning the yellow frame included in the statistical information 732, and the threshold of abandoning yellow frame for changing policy 461 (2 path) by the processing of the policy control portion 110.

FIG. 20 shows respective steps of the policy control portion 110 provided to the network management apparatus 6 according to the second embodiment. When the network management apparatus 6 receives statistical information from the core node 4, or 5 (261) after starting processing (260), the network management apparatus 6 compares the data size of abandoning the yellow frame included in the statistical information, and the threshold of abandoning yellow frame for changing policy 461 (2 path). When the data size of abandoning the yellow frame is equal to or less than the threshold of abandoning yellow frame for changing policy 461 (2 path), the network management apparatus 6 compares the data size of abandoning the yellow frame, and the threshold of abandoning yellow for changing policy 461 (1 path) (265). When the data size of abandoning the yellow frame is equal to or less than the threshold of abandoning yellow frame for changing policy 461 (1 path), the network management apparatus 6 compares the data size of abandoning the yellow frame and the threshold of abandoning yellow frame for recovering policy 462 (2 path) (268). When the data size of abandoning the yellow frame is equal to or less than the threshold of abandoning yellow frame for recovering policy 462 (2 path), the network management apparatus 6 confirms whether the path set with TRUE at the policy change flag 468 is present (269). When the path set with TRUE at the policy changing flag 268 is not present, the network management apparatus 6 is brought into a state of waiting for receiving next statistical information (261).

On the other hand, when the path set with TRUE at the policy change flag 468 is present, the network management apparatus 6 transmits policy recovering requests to color information providing nodes 465 corresponded to two paths having the highest priority set with TRUE at the policy change flags 468. Further, when only one path set with TRUE at the policy change flag 468 is present, the network management apparatus 6 transmits the policy recovering request only to the color information providing node 465 corresponded to the path. Thereafter, the network management apparatus 6 receives response(s) from the color information providing node(s) 465 and is brought into a state of waiting for receiving next statistical information (261).

At the step 268, when the data size of abandoning the yellow frame is equal to or more than the threshold of abandoning yellow for recovering policy 462 (2 path), the network management apparatus 6 compares the data size of abandoning the yellow frame, and the threshold of abandoning yellow frame for recovering policy 462 (1 path) (271). When the data size of abandoning the yellow frame is equal to or more than the threshold of abandoning yellow frame for recovering policy 462 (1 path), the network management apparatus 6 is brought into a state of awaiting for receiving next statistical information (261).

When the data size of abandoning the yellow frame is equal to or less than the threshold of abandoning yellow frame for recovering policy 462 (1 path), the network management apparatus 6 carries out processings the same as those of processing steps 226, and 227 of FIG. 3 according to the first embodiment.

Referring back to FIG. 24, when the data size of abandoning the yellow frame is equal to or less than the threshold of abandoning yellow for recovering policy 462 (2 path), the network management apparatus 6 transmits policy changing requests 734, and 735 to the edge nodes 2, and 3 corresponded to two paths having the highest priority set with TRUE at the policy change flags 468. Further, the network management apparatus 6 sets FALSE to policy change flags corresponded to the paths 2, and 3 of the path priority table 111*e*. As a result thereof, the path priority table controlled by the network management apparatus 6 is changed from a state of the path priority table 111*e* shown in FIG. 22 to the state of the path priority table 111*d* shown in FIG. 21.

Figure 16:
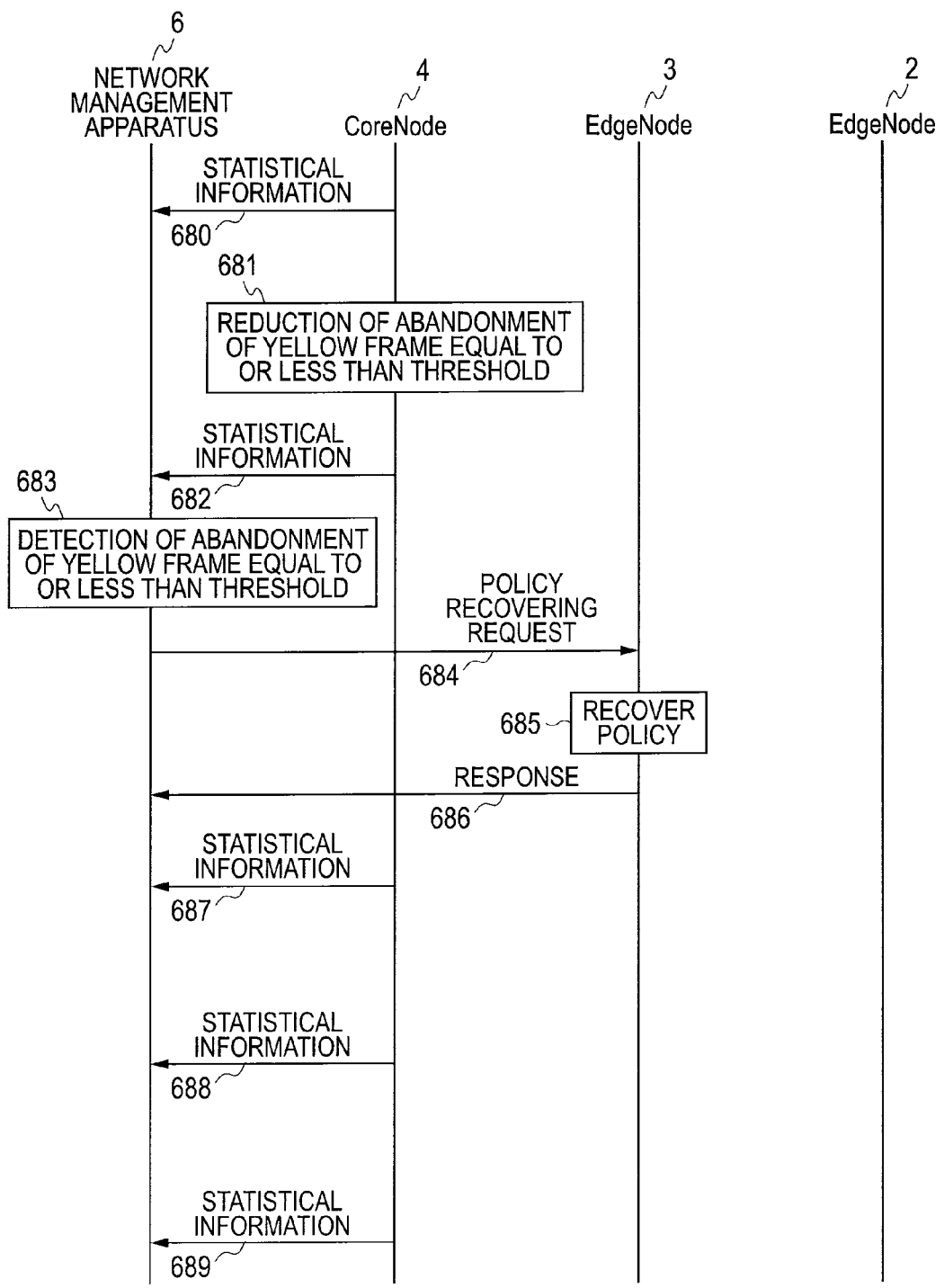
FIG. 16 is a sequence diagram showing the first embodiment, and showing other example of recovering the color information providing policy in accordance with a congested state of a node.

The edge nodes 2 and 3 change policies and transmit responses to the network management apparatus 6 by the processing procedures of FIG. 15, and FIG. 16 according to the first embodiment.

FIG. 17 shows a content of a colored frame transmitted in the path accommodated in the core node 4 as a result of the above-described processing. At paths 2, and 3, the edge nodes 2, and 3 transmit not only the green frame, but the yellow frame to the core node by recovering the policies.

By transmitting the policy changing requests simultaneously to the edge nodes 2, and 3 by the network management apparatus 6, the core node 4 can reflect a rapid reduction in traffic swiftly to color information providing policies of the edge nodes 2, and 3. As a result thereof, a service quality provided by path 2 and path 3 can be recovered.

What is claimed is:

1. A packet transport system, comprising:
    a plurality of edge nodes respectively accommodating access networks;
    a plurality of packet transfer nodes connecting the plurality of edge nodes; and
    a network management apparatus connecting the plurality of edge nodes and the plurality of packet transfer nodes, wherein:
    the plurality of edge nodes and the plurality of packet transfer nodes transmit and discard frames according to transfer priorities,
    each of the edge nodes is configured to:
        set a transfer priority to a frame flowing in from the access network in accordance with a transfer priority setting policy, wherein a respective transfer priority setting policy is set for each path, and
        transmit the frame with the set transfer priority to one of the packet transfer nodes, and
    the network management apparatus:
        receives a piece of statistical information from the packet transfer node,
        detects a congested state of the packet transfer node by analyzing the piece of statistical information,
        selects a path for which the setting transfer priority is to be changed from a plurality of paths accommodated in the packet transfer node in congestion based on path priorities of the plurality of paths, specifies one of the plurality of edge nodes to set the transfer priority to the selected path, and transmits a transfer priority setting policy changing request to the specified edge node, wherein the transfer priority setting policy changing request includes a path identifier to identify the selected path, and the specified edge node changes the transfer priority setting policy of the path corresponding to the path identifier based on the transfer priority setting policy changing request.

2. The packet transport system according to claim 1, wherein the network management apparatus:

receives the piece of statistical information including a data size of the frame transferred by the packet transfer node, and a data size of a frame to be abandoned as classified by the transfer priority from the packet transfer node, detects the congested state and a congestion recovering state of the packet transfer node by analyzing the piece of statistical information, selects the edge node from the plurality of edge nodes based on the detected congested state and the detected congestion recovering state of the packet transfer node and the path priorities, and transmits the transfer priority setting policy changing request or a transfer priority setting policy recovering request to the selected edge node.

3. The packet transport system according to claim 2, wherein:

the network management apparatus has a path identifier for identifying a path set between the plurality of edge nodes, a path priority of the path, and a piece of information corresponding to the edge node for setting the transfer priority to the frame proceeding by way of the path, when the congested state of the packet transfer node is detected, the network management apparatus transmits the transfer priority setting policy changing request to the edge node for setting the transfer priority to the frame proceeding by way of one or more of the paths having the low path priority in the paths proceeding by way of the packet transfer node, and when the congestion recovering state of the packet transfer node is detected, the network management apparatus transmits the transfer priority setting policy recovering request to the edge node for setting the transfer priority to the frame proceeding by way of one or more of the paths having the high path priority in the paths proceeding by way of the packet transfer node.

4. The packet transport system according to claim 3, wherein:

the network management apparatus transmits the policy changing request to the edge node when the data size of the frame to be abandoned as classified by the priority included in the piece of statistical information is equal to or greater than a previously set lower limit threshold, and when the data size of the frame to be abandoned as classified by the priority included in the piece of statistical information is equal to or less than a previously set upper limit threshold, the network management apparatus transmits the policy recovering request to the edge node.

5. The packet transport system according to claim 4, wherein:

the network management apparatus controls a plurality of lower limit thresholds or upper limit thresholds, when the data size of the frame to be abandoned as classified by the priority included in the piece of statistical information is equal to or greater than a plurality of previously set lower limit thresholds, the network management apparatus transmits the policy changing request to the plurality of edge nodes, and when the data size of the frame to be abandoned as classified by the priority included in the piece of statistical information is equal to or less than a plurality of upper limit thresholds, the network management apparatus transmits the policy recovering request to the plurality of the edge nodes.

6. The packet transport system according to claim 3, wherein:

the edge node controls the policy applied when the policy changing request is received from the network management apparatus, and the policy applied when the policy recovering request is received from the network management apparatus for the respective flow identifiers, and the policy is determined based on a plurality of classes classified in accordance with an inflowing band of the frame flowing in to the edge node, and the priority.

7. The packet transport system according to claim 1, wherein the edge node sets a different transfer priority to frames accommodated in the path after changing the transfer priority setting policy in accordance with the transfer priority setting policy changing request.

8. A network management apparatus connected to a plurality of edge nodes respectively accommodating access networks and a plurality of packet transfer nodes connecting the plurality of edge nodes, wherein:

the plurality of edge nodes and the plurality of packet transfer nodes transmit and discard frames according to transfer priorities, and the network management apparatus:

receives a piece of statistical information including a data size of a frame transferred from one of packet transfer nodes, and a data size of a frame to be abandoned as classified by a transfer priority from the packet transfer node, detects a congested state and a congestion recovering state by analyzing the piece of statistical information, selects a path for which the setting transfer priority is to be changed from a plurality of paths accommodated in the packet transfer node in congestion based on path priorities of the plurality of paths, specifies one of the plurality of the edge nodes to set the transfer priority to the selected path, and transmits a transfer priority setting policy changing request or a transfer priority setting policy recovering request to the specified edge node, wherein the transfer priority setting policy changing request and the transfer priority setting policy recovering request include a path identifier to identify the selected path.

9. The network management apparatus according to claim 8, wherein:

the network management apparatus has a flow identifier for identifying a path set between the plurality of edge nodes, a path priority of the path, and a piece of information corresponding to the edge node for setting the transfer priority to the frame proceeding by way of the path, when the congested state of the packet transfer node is detected, the network management apparatus transmits the transfer priority setting policy changing request to the edge node for setting the priority to the frame proceeding by way of one or more of the paths having the low path priority in the paths proceeding by way of the packet transfer node, and when the congestion recovering state of the packet transfer is detected, the network management apparatus transmits the transfer priority setting policy recovering request to the edge node for setting the transfer priority to the frame proceeding by way of one or more of the paths having the high path priority in the paths proceeding by way of the packet transfer node.

10. The network management apparatus according to claim 9, wherein:
the network management apparatus transmits the policy changing request to the edge node when the data size of the frame to be abandoned as classified by the priority included in the piece of statistical information is equal to or greater than a previously set lower limit threshold, and
when the data size of the frame to be abandoned as classified by the priority included in the piece of statistical information is equal to or less than a previously set upper limit threshold, the network management apparatus transmits the policy recovering request to the edge node.

11. The network management apparatus according to claim 10, wherein:
the network management apparatus controls a plurality of lower limit thresholds or upper limit thresholds,
when the data size of the frame to be abandoned as classified by the priority included in the piece of statistical information is equal to or greater than a plurality of previously set lower limit thresholds, the network management apparatus transmits the policy changing request to the plurality of edge nodes, and
when the data size of the frame to be abandoned as classified by the priority included in the piece of statistical information is equal to or less than a plurality of previously set upper limit thresholds, the network management apparatus transmits the policy recovering request to the plurality of edge nodes.

12. An edge node comprising:
an interface for connecting to a plurality of packet transfer nodes and a network management apparatus, wherein:
the edge node and the plurality of packet transfer nodes transmit and discard frames according to transfer priorities,
the edge node accommodates an access network in a communication network, and
the edge node further comprises a processor that:
sets a transfer priority to a frame flowing in from the access network in accordance with a transfer priority setting policy, wherein a respective transfer priority setting policy is set for each path,
transmits the frame with the set transfer priority to one of the packet transfer nodes,
receives a transfer priority setting policy changing request from the network management apparatus, wherein the transfer priority setting policy changing request includes a path identifier to identify a path selected by the network management apparatus for which the setting transfer priority is to be changed, and
changes the transfer priority setting policy of the path corresponding to the path identifier based on the transfer priority setting policy changing request, and
a congested state of the packet transfer node is detected by the network management apparatus based on a piece of statistical information from the packet transfer node, and
the path is selected by the network management apparatus from a plurality of paths accommodated in the packet transfer node in congestion based on path priorities of the plurality of paths.

13. The edge node according to claim 12, wherein:
the edge node is further connected to a network management apparatus,
the network management apparatus is connected to the packet transfer node,
the edge node controls a policy applied when a policy changing request is received from the network management apparatus, and the policy applied when a policy recovering request is received from the network management apparatus, and
the policy is determined in correspondence with a plurality of classes classified in accordance with an inflowing band of the frame flowing in to the edge node, and the priority.

* * * * *